(12) United States Patent
Leavitt et al.

(10) Patent No.: US 10,513,103 B2
(45) Date of Patent: Dec. 24, 2019

(54) RIPPLE REDUCTION IN AN ADDITIVE MANUFACTURING SYSTEM

(71) Applicant: Stratasys, Inc., Eden Prairie, MN (US)

(72) Inventors: Paul J. Leavitt, Minneapolis, MN (US); Andrew Rice, Chaska, MN (US); Timothy Hjelsand, Waconia, MN (US)

(73) Assignee: STRATASYS, INC., Eden Prairie, MN (US)

(*) Notice: Subject to any disclaimer, the term of this patent is extended or adjusted under 35 U.S.C. 154(b) by 405 days.

(21) Appl. No.: 15/327,856

(22) PCT Filed: Jul. 21, 2015

(86) PCT No.: PCT/US2015/041351
§ 371 (c)(1),
(2) Date: Jan. 20, 2017

(87) PCT Pub. No.: WO2016/014545
PCT Pub. Date: Jan. 28, 2016

(65) Prior Publication Data
US 2017/0203507 A1    Jul. 20, 2017

Related U.S. Application Data

(60) Provisional application No. 62/027,469, filed on Jul. 22, 2014.

(51) Int. Cl.
*B01D 45/12* (2006.01)
*B33Y 10/00* (2015.01)
(Continued)

(52) U.S. Cl.
CPC .............. *B33Y 10/00* (2014.12); *B29C 48/02* (2019.02); *B29C 48/05* (2019.02);
(Continued)

(58) Field of Classification Search
CPC ...... B29C 67/0055; B29C 2947/92095; B29C 2947/92104; B29C 2947/9239;
(Continued)

(56) References Cited

U.S. PATENT DOCUMENTS

| 3,746,481 A | 7/1973 | Schippers |
| 5,503,785 A | 4/1996 | Crump et al. |

(Continued)

FOREIGN PATENT DOCUMENTS

| EP | 2532505 A1 | 12/2012 |
| JP | 2000127251 A | 5/2000 |

(Continued)

OTHER PUBLICATIONS

European Communication pursuant to Article 94(3) EPC dated Mar. 13, 2018, for corresponding European Application No. 15745687.2, filed Jan. 27, 2017.

(Continued)

*Primary Examiner* — Muhammad S Islam
(74) *Attorney, Agent, or Firm* — Westman, Champlin & Koehler, P.A.

(57) ABSTRACT

An assembly for use in an additive manufacturing system to print a three-dimensional part that includes an extruder comprising a gear and a motor that turns the gear, wherein rotation of the gear regulates a flow of material out of the extruder. A controller, provides a control signal to the motor to control the rate at which the motor turns the at least one gear and incorporates a time-varying signal into the control signal to reduce ripples in the material output by the extruder.

20 Claims, 16 Drawing Sheets

(51) Int. Cl.
- *B33Y 30/00* (2015.01)
- *B33Y 40/00* (2015.01)
- *B33Y 50/02* (2015.01)
- *B29C 64/106* (2017.01)
- *B29C 64/386* (2017.01)
- *B29C 48/92* (2019.01)
- *B29C 48/02* (2019.01)
- *B29C 48/05* (2019.01)
- *B29C 48/255* (2019.01)
- *B29C 48/25* (2019.01)
- *B29C 48/37* (2019.01)
- *B29K 105/00* (2006.01)
- *B29C 48/285* (2019.01)

(52) U.S. Cl.
CPC ........ *B29C 48/2552* (2019.02); *B29C 48/266* (2019.02); *B29C 48/37* (2019.02); *B29C 48/92* (2019.02); *B29C 64/106* (2017.08); *B29C 64/386* (2017.08); *B33Y 30/00* (2014.12); *B33Y 40/00* (2014.12); *B33Y 50/02* (2014.12); *B29C 48/2886* (2019.02); *B29C 2948/926* (2019.02); *B29C 2948/9239* (2019.02); *B29C 2948/92095* (2019.02); *B29C 2948/92104* (2019.02); *B29C 2948/92457* (2019.02); *B29C 2948/92952* (2019.02); *B29K 2105/0067* (2013.01)

(58) Field of Classification Search
CPC .... B29C 2947/92457; B29C 2947/926; B29C 2947/92952; B29C 2948/92095; B29C 2948/92104; B29C 2948/9239; B29C 2948/92457; B29C 2948/926; B29C 2948/92952; B29C 47/0014; B29C 47/0813; B29C 47/0866; B29C 47/1054; B29C 47/364; B29C 48/02; B29C 48/05; B29C 48/2552; B29C 48/266; B29C 48/2886; B29C 48/37; B29C 48/92; B29C 64/106; B29C 64/386; B29C 67/0088; B29K 2105/0067; B33Y 10/00; B33Y 30/00; B33Y 50/02; B33Y 40/00
See application file for complete search history.

(56) References Cited

U.S. PATENT DOCUMENTS

| | | | |
|---|---|---|---|
| 6,004,124 A | 12/1999 | Swanson et al. | |
| 6,280,784 B1 | 8/2001 | Yang et al. | |
| 7,127,309 B2 | 10/2006 | Dunn et al. | |
| 7,384,255 B2 | 6/2008 | LaBossiere et al. | |
| 7,604,470 B2 | 10/2009 | LaBossiere et al. | |
| 7,625,200 B2 | 12/2009 | Leavitt | |
| 7,896,209 B2 | 3/2011 | Batchelder et al. | |
| 7,897,074 B2 | 3/2011 | Batchelder et al. | |
| 8,153,182 B2 | 4/2012 | Comb et al. | |
| 8,221,669 B2 | 7/2012 | Batchelder et al. | |
| 8,236,227 B2 | 8/2012 | Batchelder et al. | |
| 8,403,658 B2 | 3/2013 | Swanson | |
| 8,439,665 B2 | 5/2013 | Batchelder et al. | |
| 8,647,102 B2 | 2/2014 | Swanson et al. | |
| 2003/0056870 A1* | 3/2003 | Comb | B29C 48/92 156/64 |
| 2005/0015175 A1 | 1/2005 | Huang | |
| 2009/0208357 A1 | 8/2009 | Garrett | |
| 2009/0244225 A1 | 10/2009 | Hays et al. | |
| 2009/0320866 A1 | 12/2009 | Shirakashi et al. | |
| 2011/0076495 A1* | 3/2011 | Batchelder | D01D 5/42 428/369 |
| 2012/0018924 A1 | 1/2012 | Swanson et al. | |
| 2012/0070523 A1 | 3/2012 | Swanson et al. | |
| 2013/0078073 A1 | 3/2013 | Comb et al. | |
| 2013/0161432 A1 | 6/2013 | Mannella et al. | |
| 2013/0161442 A1 | 6/2013 | Mannella et al. | |
| 2013/0209600 A1 | 8/2013 | Tow | |
| 2014/0158802 A1 | 6/2014 | Batchelder et al. | |
| 2014/0159273 A1* | 6/2014 | Koop | B65H 51/10 264/129 |
| 2014/0159284 A1 | 6/2014 | Leavitt | |
| 2015/0096717 A1 | 4/2015 | Batchelder et al. | |
| 2015/0097053 A1 | 4/2015 | Batchelder et al. | |
| 2015/0182811 A1 | 7/2015 | Bender | |

FOREIGN PATENT DOCUMENTS

| | | |
|---|---|---|
| JP | 2002500965 A | 1/2002 |
| JP | 2003062891 A | 3/2003 |
| WO | 97/19798 | 6/1997 |
| WO | 99/37453 | 7/1999 |

OTHER PUBLICATIONS

Korean Office Action dated Apr. 3, 2018 for corresponding Korean Application No. 10-2017-7004796, filed Feb. 21, 2017.
Japanese Decision of Final Rejection dated Aug. 14, 2018 for corresponding Japanese Application No. 2017-503930, filed Jan. 23, 2017.
Chinese Office Action dated Jul. 21, 2017 for corresponding Chinese Application No. 201590000820.9, filed Jan. 22, 2017.
Japanese Order for Amendment dated Jan. 15, 2019 for corresponding Japanese Application No. 2018-004850, filed Dec. 12, 2018.
Japanese Office Action dated Apr. 24, 2018 for corresponding Japanese Application No. 2017-503930, filed Jan. 23, 2017.
International Search Report and Written Opinion dated Oct. 20, 2015 for corresponding International Application No. PCT/US2015/041351, filed Jul. 21, 2015.
Korean Notice of Decision for Final Rejection dated Sep. 27, 2018, for corresponding Korean Application No. 10-2017-7004796, filed Feb. 21, 2017.

* cited by examiner

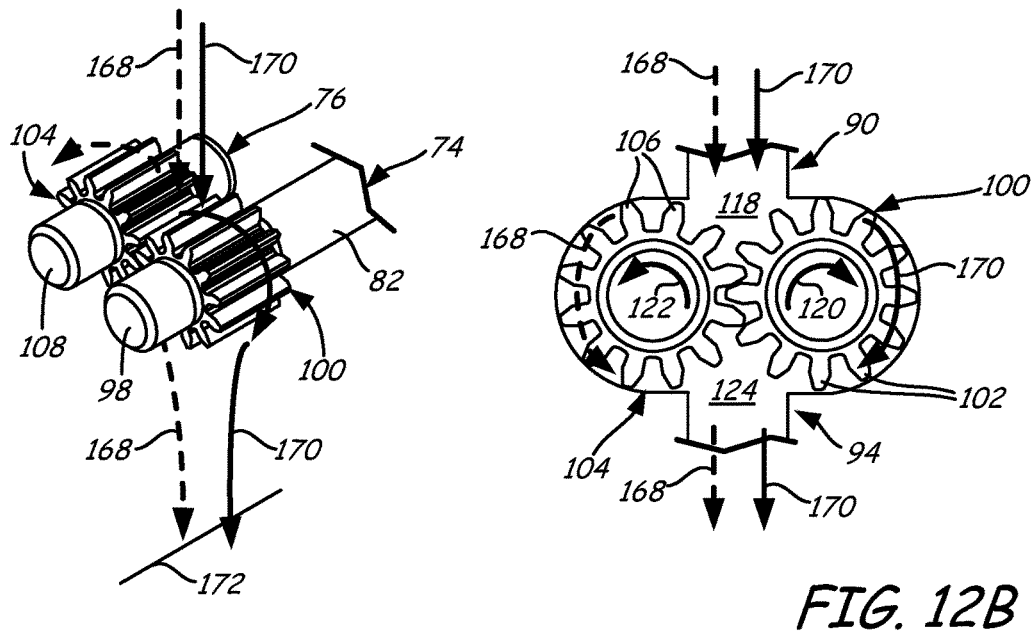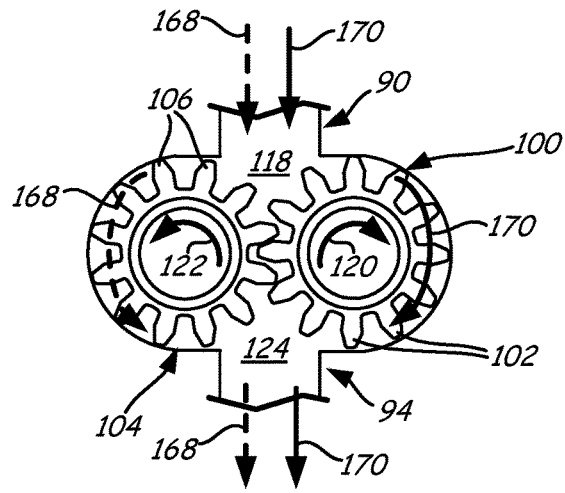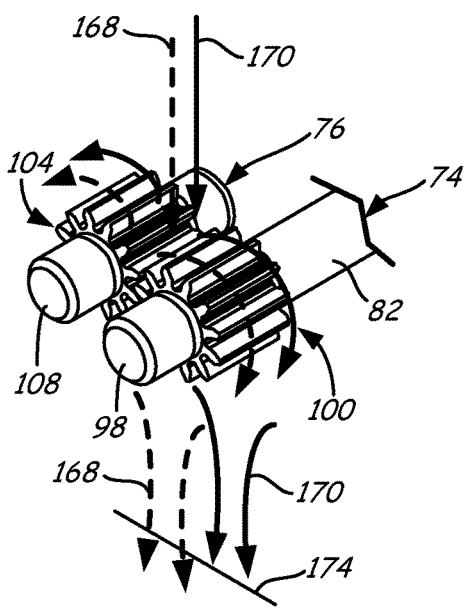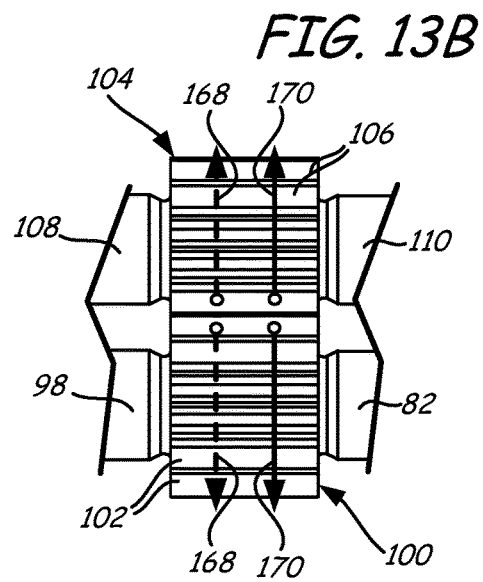

US 10,513,103 B2

RIPPLE REDUCTION IN AN ADDITIVE MANUFACTURING SYSTEM

CROSS-REFERENCE TO RELATED APPLICATION

This Application is a Section 371 National Stage Application of International Application No. PCT/US2015/041351, filed Jul. 21, 2015 and published as WO/2016/014545 on Jan. 28, 2016, in English, which claims priority to U.S. Patent Application No. 62/027,469, filed on Jul. 22, 2014, the contents of which are hereby incorporated by reference in their entirety.

BACKGROUND

The present disclosure relates to additive manufacturing systems for printing or otherwise producing three-dimensional (3D) parts and support structures. In particular, the present disclosure relates to print head extruders for printing 3D parts and support structures in a layer-by-layer manner using an additive manufacturing technique.

Additive manufacturing systems are used to print or otherwise build 3D parts from digital representations of the 3D parts (e.g., AMF and STL format files) using one or more additive manufacturing techniques. Examples of commercially available additive manufacturing techniques include extrusion-based techniques, jetting, selective laser sintering, powder/binder jetting, electron-beam melting, and stereolithographic processes. For each of these techniques, the digital representation of the 3D part is initially sliced into multiple horizontal layers. For each sliced layer, a tool path is then generated, which provides instructions for the particular additive manufacturing system to print the given layer.

For example, in an extrusion-based additive manufacturing system, a 3D part may be printed from a digital representation of the 3D part in a layer-by-layer manner by extruding a flowable part material. The part material is extruded through an extrusion tip carried by a print head of the system, and is deposited as a sequence of roads on a platen in planar layers. The extruded part material fuses to previously deposited part material, and solidifies upon a drop in temperature. The position of the print head relative to the substrate is then incremented, and the process is repeated to form a 3D part resembling the digital representation.

In fabricating 3D parts by depositing layers of a part material, supporting layers or structures are typically built underneath overhanging portions or in cavities of 3D parts under construction, which are not supported by the part material itself. A support structure may be built utilizing the same deposition techniques by which the part material is deposited. The host computer generates additional geometry acting as a support structure for the overhanging or free-space segments of the 3D part being formed. Support material is then deposited pursuant to the generated geometry during the printing process. The support material adheres to the part material during fabrication, and is removable from the completed 3D part when the printing process is complete.

SUMMARY

An aspect of the present disclosure is directed an assembly for use in an additive manufacturing system to print a three-dimensional part that includes an extruder comprising a gear and a motor that turns the gear, wherein rotation of the gear regulates a flow of material out of the extruder. A controller provides a control signal to the motor to control the rate at which the motor turns the gear and incorporates a time-varying signal into the control signal, to reduce ripples in the material output by the extruder.

Another aspect of the present disclosure is directed to an additive manufacturing system for printing three-dimensional parts, the additive manufacturing system including a casing assembly having an interior cavity and an outlet opening. A motor is configured to move a pump member within the interior cavity of the casing assembly. A controller assembly is operably connected to the motor to provide command signals to the motor. The command signals control the rate at which the motor moves the pump member and include a time-varying component that reduces variations in a volume of material extruded through the outlet opening.

Another aspect of the present disclosure is directed to a method for printing a three-dimensional part with an additive manufacturing system. The method includes controlling an extruder so that the extruder extrudes material onto a surface as part of printing the three-dimensional part. Controlling the pump involves applying a time-varying signal to the extruder to compensate for time-varying changes in the flow of material that would otherwise occur due to mechanical features of the extruder.

Definitions

Unless otherwise specified, the following terms as used herein have the meanings provided below:

The terms "axial" and "axially", such as with reference to pressures applied to a liquefier having a longitudinal length, refer to directions that are perpendicular to the longitudinal length. These terms do not require a concentric axis, and also apply to non-cylindrical liquefiers, such as rectangular liquefiers, arcuate liquefiers, elliptical liquefiers, and the like.

The term "operably connected", with reference to articles being operably connected to each other, refers to direct connections (physically in contact with each other) and indirect connections (connected to each other with one or more additional components, such as spacers, disposed between them).

The terms "command", "commanding", and the like, with reference to a controller assembly commanding a device (e.g., a drive mechanism, a heater assembly, and the like), refers to directly and/or indirectly relaying control signals from the controller assembly to the device such that the device operates in conformance with the relayed signals. The signals may be relayed in any form, such as communication signals to a microprocessor on the device, applied electrical power to operate the device, and the like.

The terms "preferred", "preferably", "example" and "exemplary" refer to embodiments of the invention that may afford certain benefits, under certain circumstances. However, other embodiments may also be preferred or exemplary, under the same or other circumstances. Furthermore, the recitation of one or more preferred or exemplary embodiments does not imply that other embodiments are not useful, and is not intended to exclude other embodiments from the scope of the present disclosure.

Directional orientations such as "above", "below", "top", "bottom", and the like are made with reference to a layer-printing direction of a 3D part. In the embodiments shown below, the layer-printing direction is the upward direction along the vertical z-axis. In these embodiments, the terms "above", "below", "top", "bottom", and the like are based on the vertical z-axis. However, in embodiments in which the layers of 3D parts are printed along a different axis, such as along a horizontal x-axis or y-axis, the terms "above", "below", "top", "bottom", and the like are relative to the given axis.

The term "providing", such as for "providing a material", when recited in the claims, is not intended to require any particular delivery or receipt of the provided item. Rather, the term "providing" is merely used to recite items that will be referred to in subsequent elements of the claim(s), for purposes of clarity and ease of readability.

Unless otherwise specified, temperatures referred to herein are based on atmospheric pressure (i.e. one atmosphere).

The terms "about" and "substantially" are used herein with respect to measurable values and ranges due to expected variations known to those skilled in the art (e.g., limitations and variabilities in measurements).

BRIEF DESCRIPTION OF THE DRAWINGS

FIG. 12A is a front perspective view of the engaged drive and idler gears, which illustrates flow profiles from the two liquefiers around the drive and idler gears.

FIG. 12B is a front schematic view of the engaged drive and idler gears and flow profiles shown in FIG. 12A.

FIG. 13A is a front perspective view of the engaged drive and idler gears, which illustrates alternative flow profiles from the two liquefiers around the idler and drive gears, where the two liquefiers are oriented orthogonal to those shown in FIGS. 12A and 12B.

FIG. 13B is a top schematic view of the engaged drive and idler gears and flow profiles shown in FIG. 13A.

DETAILED DESCRIPTION

The present disclosure is directed to a print head extruder for use in an additive manufacturing system to print 3D parts and support structures in a layer-by-layer manner using an additive manufacturing technique. As discussed below, the extruder includes one or more upstream liquefiers that function as a pressure-generating stage, and a downstream gear assembly that functions as a flow-regulating stage, where consumable materials are fed to and melted in the one or more upstream liquefiers, and the resulting molten material(s) are then provided to the downstream gear assembly. At the downstream gear assembly, the molten material(s) are controllably pumped, metered, or otherwise provided to an extrusion nozzle, where they are extruded to produce a series of roads of a 3D part or support structure.

The present disclosure is also directed to a controller assembly of the additive manufacturing system, which is configured to operate the downstream gear assembly in one of two modes, depending on the feed and melting properties of the upstream liquefier(s). In a first embodiment, the downstream gear assembly functions as a downstream gear pump that preferably receives the molten material(s) from the upstream liquefier(s) at lower positive pressures. In this "gear pump" embodiment, the controller assembly may command the downstream gear assembly to actively pump or pressurize the molten materials for extrusion.

In a second embodiment, the downstream gear assembly functions as a downstream gear brake that preferably receives the molten material(s) from the upstream liquefier(s) at higher positive pressures. In this "gear brake" embodiment, the controller assembly may command the downstream gear assembly to controllably limit or meter the flow of the pressurized molten materials for extrusion.

In either embodiment, the upstream liquefier(s) preferably generate a pressurized flow of the molten material(s) to the downstream gear assembly, and the downstream gear assembly preferably regulates the flow of the molten material(s) for printing 3D parts and support structures. In particular, the downstream gear assembly can potentially provide a faster and more consistent transient response versus a conventional liquefier since it does not have a moving meniscus, and has a smaller volume of molten material that needs to be pressurized before flow out of a nozzle, and does not experience a melt phase change and related material expansion further complicating material metering. As such, the downstream gear assembly has a small and consistent volume of pressurized material between its gears and the nozzle.

Figure 1:
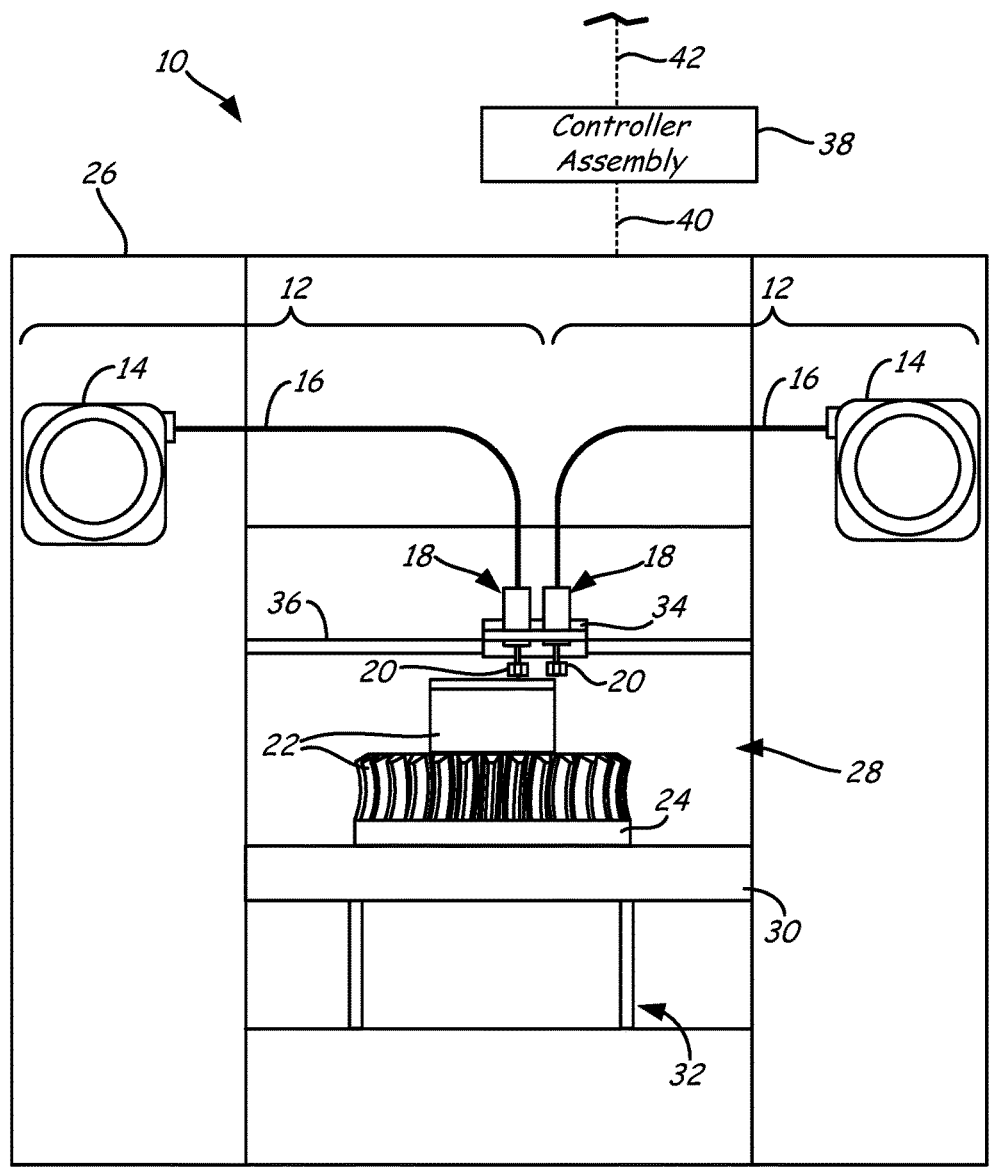
FIG. 1 is a front view of an additive manufacturing system configured to print 3D parts and support structures with the use of one or more extruders of the present disclosure.

The liquefier assembly of the present disclosure may be used with any suitable extrusion-based additive manufacturing system. For example, FIG. 1 shows system 10 in use with two consumable assemblies 12, where each consumable assembly 12 is an easily loadable, removable, and replaceable container device that retains a supply of a consumable filament for printing with system 10. Typically, one of the consumable assemblies 12 contains a part material filament, and the other consumable assembly 12 contains a support material filament. However, both consumable assemblies 12 may be identical in structure, and, in some cases, both consumable assemblies 12 may contain part material filaments.

In the shown embodiment, each consumable assembly 12 includes container portion 14, guide tube 16, and print heads 18, where each print head 18 preferably includes an extruder 20 of the present disclosure. Container portion 14 may retain a spool, coil, or other supply arrangement of a consumable filament, such as discussed in Mannella et al., U.S. Publication Nos. 2013/0161432 and 2013/0161442; and in Batchelder et al., U.S. Publication No. 2014/0158802.

Guide tube 16 interconnects container portion 14 and print head 18, where a drive mechanism of print head 18 (and/or of system 10) draws successive segments of the consumable filament from container portion 14, through guide tube 16, to the extruder 20 of the print head 18. In this embodiment, guide tube 16 and print head 18 are subcomponents of consumable assembly 12, and may be interchanged to and from system 10 with each consumable assembly 12. Alternatively, as discussed below, guide tube 16 and/or print head 18 (or parts thereof) may be components of system 10, rather than subcomponents of consumable assemblies 12.

System 10 is an additive manufacturing system for printing 3D parts or models and corresponding support structures (e.g., 3D part 22 and support structure 24) from the part and support material filaments, respectively, of consumable assemblies 12, using a layer-based, additive manufacturing technique. Suitable additive manufacturing systems for system 10 include extrusion-based systems developed by Stratasys, Inc., Eden Prairie, Minn., such as fused deposition modeling systems under the trademark "FDM".

As shown, system 10 includes system housing 26, chamber 28, platen 30, platen gantry 32, head carriage 34, and head gantry 36. System housing 26 is a structural component of system 10 and may include multiple structural subcomponents such as support frames, housing walls, and the like. In some embodiments, system housing 26 may include container bays configured to receive container portions 14 of consumable assemblies 12. In alternative embodiments, the container bays may be omitted to reduce the overall footprint of system 10. In these embodiments, container portions 14 may stand adjacent to system housing 26, while providing sufficient ranges of movement for guide tubes 16 and print heads 18.

Chamber 28 is an enclosed environment that contains platen 30 for printing 3D part 22 and support structure 24. Chamber 28 may be heated (e.g., with circulating heated air) to reduce the rate at which the part and support materials solidify after being extruded and deposited (e.g., to reduce distortions and curling). In alternative embodiments, chamber 28 may be omitted and/or replaced with different types of build environments. For example, 3D part 22 and support structure 24 may be built in a build environment that is open to ambient conditions or may be enclosed with alternative structures (e.g., flexible curtains).

Platen 30 is a platform on which 3D part 22 and support structure 24 are printed in a layer-by-layer manner, and is supported by platen gantry 32. In some embodiments, platen 30 may engage and support a build substrate, which may be a tray substrate as disclosed in Dunn et al., U.S. Pat. No. 7,127,309, fabricated from plastic, corrugated cardboard, or other suitable material, and may also include a flexible polymeric film or liner, painter's tape, polyimide tape (e.g., under the trademark KAPTON from E.I. du Pont de Nemours and Company, Wilmington, Del.), or other disposable fabrication for adhering deposited material onto the platen 30 or onto the build substrate. Platen gantry 32 is a gantry assembly configured to move platen 30 along (or substantially along) the vertical z-axis.

Head carriage 34 is a unit configured to receive one or more removable print heads, such as print heads 18, and is supported by head gantry 36. Examples of suitable devices for head carriage 34, and techniques for retaining print heads 18 in head carriage 34, include those disclosed in Swanson et al., U.S. Pat. Nos. 8,403,658 and 8,647,102. In some preferred embodiments, each print head 18 is configured to engage with head carriage 34 to securely retain the print head 18 in a manner that prevents or restricts movement of the print head 18 relative to head carriage 34 in the x-y build plane, but allows the print head 18 to be controllably moved out of the x-y build plane (e.g., servoed, toggled, or otherwise switched in a linear or pivoting manner).

Head gantry 36 is a belt-driven gantry assembly configured to move head carriage 34 (and the retained print heads 18) in (or substantially in) a horizontal x-y plane above chamber 28. Examples of suitable gantry assemblies for head gantry 36 include those disclosed in Comb et al., U.S. Publication No. 2013/0078073, where head gantry 36 may also support deformable baffles (not shown) that define a ceiling for chamber 28. In alternative embodiments, head gantry 36 may utilize any suitable mechanism for moving head carriage 34 (and the retained print heads 18), such as robotic actuators, and the like.

In a further alternative embodiment, platen 30 may be configured to move in the horizontal x-y plane within chamber 28, and head carriage 34 (and print heads 18) may be configured to move along the z-axis. Other similar arrangements may also be used such that one or both of platen 30 and print heads 18 are moveable relative to each other. Platen 30 and head carriage 34 (and print heads 18) may also be oriented along different axes. For example, platen 30 may be oriented vertically and print heads 18 may print 3D part 22 and support structure 24 along the x-axis or the y-axis. In another example, platen 30 and/or head carriage 34 (and print heads 18) may be moved relative to each other in a non-Cartesian coordinate system, such as in a polar coordinate system.

In the above-discussed embodiment, guide tube 16 and print head 18 are subcomponents of consumable assembly 12. However, in alternative embodiments, guide tube 16 and/or print head 18 may be components of system 10, rather than subcomponents of consumable assemblies 12. In these embodiments, additional examples of suitable devices for print heads 18, and the connections between print heads 18, head carriage 34, and head gantry 36 include those disclosed in Crump et al., U.S. Pat. No. 5,503,785; Swanson et al., U.S. Pat. No. 6,004,124; LaBossiere, et al., U.S. Pat. Nos. 7,384,255 and 7,604,470; Batchelder et al., U.S. Pat. Nos. 7,896,209 and 7,897,074; and Comb et al., U.S. Pat. No. 8,153,182. For instance, extruder 20 may optionally be retrofitted into an existing additive manufacturing system.

In further alternative embodiments (e.g., as shown below in FIG. 10), some parts of print head 18 and extruder 20 may be subcomponents of system 10. In this case, other parts of print head 18 and extruder 20 may be subcomponents of the interchangeable consumable assembly 12, which are engageable with (and removable from) the parts that are subcomponents of system 10.

System 10 also includes controller assembly 38, which is one or more computer-based systems configured to operate the components of system 10. Controller assembly 38 may communicate over communication line(s) 40 with the various components of system 10, such as print heads 18 (including extruder 20), chamber 28 (e.g., with a heating unit for chamber 28), head carriage 34, motors for platen gantry 32 and head gantry 36, and various sensors, calibration devices, display devices, and/or user input devices. In some embodiments, controller assembly 38 may also communicate with one or more of platen 30, platen gantry 32, head gantry 36, and any other suitable component of system 10.

Additionally, controller assembly 38 may also communicate over communication line 42 with external devices, such as other computers and servers over a network connection (e.g., a local area network (LAN) connection, a universal serial bus (USB) connection, or the like). While communication lines 40 and 42 are each illustrated as a single signal line, they may each include one or more electrical, optical, and/or wireless signal lines and intermediate control circuits, where portions of communication line(s) 40 may also be subcomponents of the removable print heads 18.

In some embodiments, the one or more computer-based systems of controller assembly 38 are internal to system 10, allowing a user to operate system 10 over a network communication line 42, such as from an external computer in the same or similar manner as a two-dimensional printer. Alternatively, controller assembly 38 may also include one or more external computer-based systems (e.g., desktop, laptop, server-based, cloud-based, tablet, mobile media device, and the like) that may communicate with the internal computer-based system(s) of controller assembly 38, as well as communicating over a network via communication line 42.

In this alternative embodiment, the processing functions of controller assembly 38 discussed below may be divided between the internal and external computer-based systems. In yet another alternative embodiment, the computer-based system(s) of controller assembly 38 may all be located external to system 10 (e.g., one or more external computers), and may communicate with system 10 over communication line(s) 40.

During a printing operation, controller assembly 38 may direct platen gantry 32 to move platen 30 to a predetermined height within chamber 28. Controller assembly 38 may then direct head gantry 36 to move head carriage 34 (and the retained print heads 18) around in the horizontal x-y plane above chamber 28. Controller assembly 38 may also command print heads 18 to selectively draw successive segments of the consumable filaments from container portions 14 and through guide tubes 16, respectively.

The successive segments of each consumable filament are then melted in the extruder 20 of the respective print head 18 to produce a molten material, as discussed below. Upon exiting extruder 20, the resulting extrudate may be deposited onto platen 30 as a series of roads for printing 3D part 22 or support structure 24 in a layer-by-layer manner. After the print operation is complete, the resulting 3D part 22 and support structure 24 may be removed from chamber 28, and support structure 24 may be removed from 3D part 22. 3D part 22 may then undergo one or more additional post-processing steps, as desired.

Figure 2:
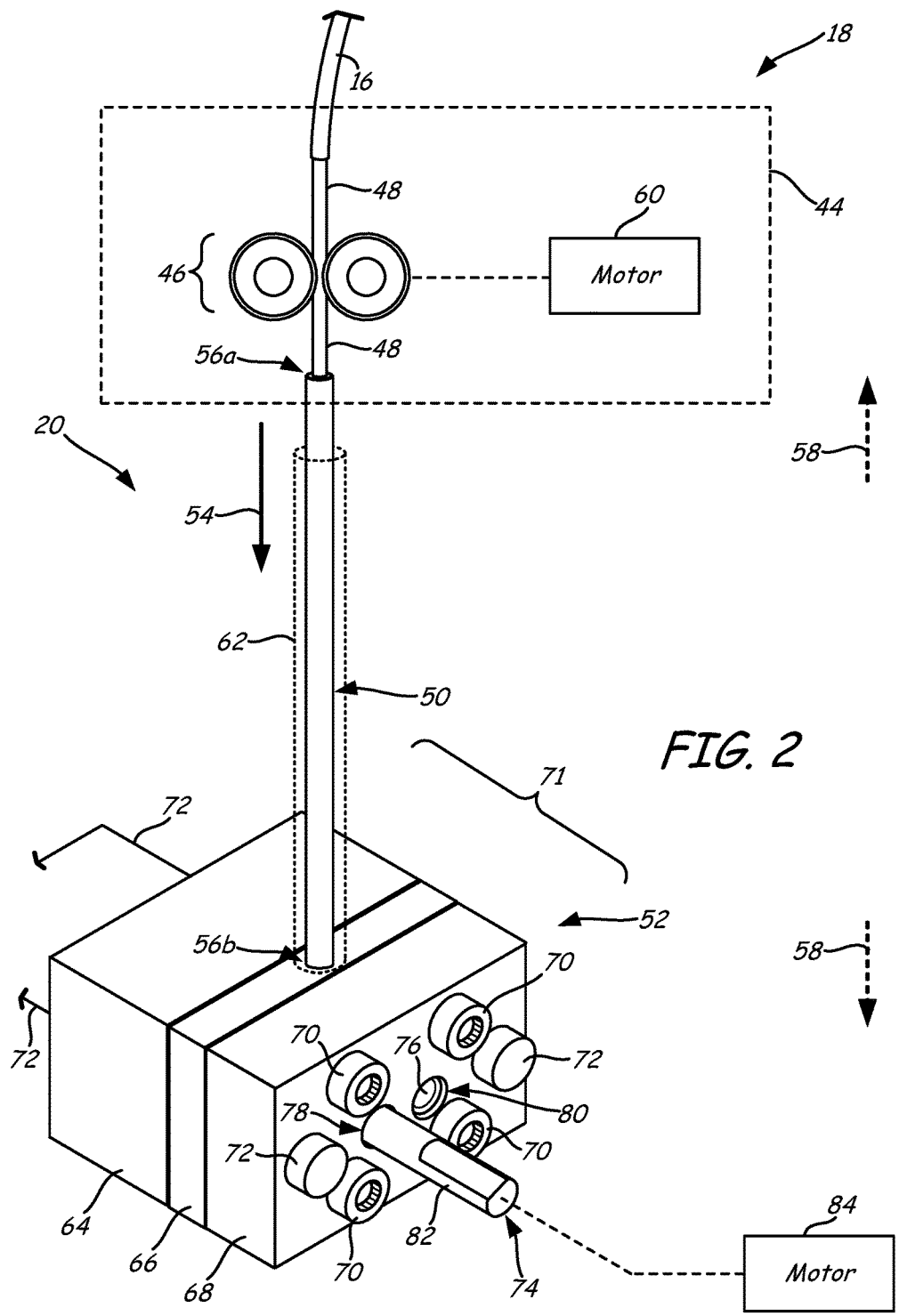
FIG. 2 is a rear perspective view of a print head with an extruder of the present disclosure, where the extruder includes an upstream liquefier and a downstream gear assembly.

FIG. 2 is a rear perspective view of an example print head 18, which includes housing 44, drive mechanism 46, and an extruder 20 of the present disclosure, which are shown in use with filament 48. Examples of suitable components for housing 44 and drive mechanism 46 include those discussed in LaBossiere et al., U.S. Pat. No. 7,604,470; Batchelder et al., U.S. Pat. Nos. 7,896,209; 7,897,074; and 8,236,227; Swanson et al., U.S. Pat. No. 8,647,102; Koop et al., U.S. Publication No. 2014/0159273; and Leavitt, U.S. Publication No. 2014/0159284. However, extruder 20 may be incorporated into any print head that is suitable for use with system 10.

As shown, extruder 20 includes an upstream liquefier 50 and a downstream gear assembly 52, where, as used herein, the terms "upstream" and "downstream" are made with reference to a filament feed direction, as illustrated by arrow 54. Liquefier 50 is an example liquefier configured to receive and melt a consumable material (e.g., filament 48), thereby generating a pressurized flow of the molten material that is provided to gear assembly 52. In the shown example, liquefier 50 is a rigid hollow tube fabricated from one or more thermally-conductive materials (e.g., stainless steel), with an inlet end 56a and an outlet end 56b offset from each other along longitudinal axis 58.

Examples of suitable cylindrical geometries for liquefier 50 include those disclosed in Crump et al., U.S. Pat. No. 5,503,785; Swanson et al., U.S. Pat. No. 6,004,124; LaBossiere, et al., U.S. Pat. No. 7,604,470; Leavitt, U.S. Pat. No. 7,625,200; and Batchelder et al., U.S. Pat. No. 8,439,665. As shown, liquefier 50 is thin walled, having an exemplary wall thickness ranging from about 0.01 inches to about 0.03 inches. Exemplary inner diameters for liquefier 50 range from about 0.05 inches to about 0.10 inches. Exemplary lengths for liquefier 50 between inlet end 56a and outlet end 56b include at least about 1.5 inches, and ranging to several inches.

In alternative embodiments, liquefier 50 may have a ribbon liquefier architecture for use with a ribbon filament. The term "ribbon filament" as used herein refers to a filament (e.g., filament 48) having a substantially rectangular, arcuate, and/or an elliptical cross-section along its longitudinal length, which may optionally include one or more surface tracks for engaging with drive mechanism 46, such as disclosed in Batchelder et al., U.S. Pat. No. 8,236,227. Correspondingly, the term "ribbon liquefier" as used herein refers to a hollow liquefier (e.g., liquefier 50) having a substantially rectangular, arcuate, and/or an elliptical inner-channel cross-section along its longitudinal length. Examples of suitable ribbon filaments and ribbon liquefier architectures for filament 48 and liquefier 50 include those discussed in Batchelder et al., U.S. Pat. Nos. 8,221,669; 8,236,227; and 8,439,665.

Other suitable liquefiers include those disclosed in U.S. Patent Publications Nos. 2015/0096717 and 2015/0097053.

Inlet end 56a of liquefier 50 is operably connected to housing 44 such that liquefier 50 suspends below housing 44 when installed to system 10. Gear assembly 52 is preferably connected to outlet end 56b of liquefier 50 such that gear assembly 52 suspends below housing 44 and liquefier 50 when installed to system 10. In alternative embodiments, one or more portions of liquefier 50 and/or gear assembly 52 may be retained within housing 44, or one or more additional components may operably connect outlet end 56b of liquefier 50 to gear assembly 52. Furthermore, gear assembly 52 may also be operably connected to housing 44 in addition to the connection to outlet end 56b of liquefier 50.

Drive mechanism 46 is a filament drive mechanism that is configured to feed successive segments of filament 48 from guide tube 16 to inlet end 56a of liquefier 50 under motorized power of motor 60 (e.g., a step motor), based on commands from controller assembly 38. Examples of suitable devices for drive mechanism 46 includes those disclosed in LaBossiere, et al., U.S. Pat. No. 7,384,255; and Batchelder et al., U.S. Pat. No. 7,896,209.

While drive mechanism 46 and motor 60 are preferably positioned directly upstream from liquefier 50 (e.g., within housing 44), as shown in FIG. 2, in alternative embodiments, one or more drive mechanisms may be positioned at any suitable location(s) along the pathway of filament 48 between (and including) container 14 and liquefier 50, such as at a fixed location within system 10. In some embodiments, a spool drive mechanism (not shown) may be used to engage with a spool in container 14, where the spool holds a wound supply of filament 48. In this case, the spool drive mechanism may rotate the spool to feed filament 48 through guide tube 16 and into liquefier 50 (rather than directly engaging filament 48). This reduces weight of print head 18. In addition, the filament drive control can operate with less fidelity as it only needs to supply pressure, and is not performing the tasks of coordinating melt extrusion to gantry motion at high accelerations and start/stops.

Furthermore, multiple drive mechanisms may be used together. For instance, a first drive mechanism may be used to feed filament 48 from container 14 to print head 18. A second drive mechanism (e.g., drive mechanism 46) retained by print head 18 may then receive the fed filament 48 from the first drive mechanism, and feed the received filament 48 into liquefier 50.

As further shown in FIG. 2, extruder 20 also includes an upstream heater assembly 62, which is one or more heating elements configured to transfer heat to at least a portion of the length of liquefier 50. The transferred heat melts the received filament 48 within liquefier 50, thereby producing a molten material of filament 48 for delivery to gear assembly 52. Examples of suitable assemblies for heater assembly 62 includes those disclosed in Crump et al., U.S. Pat. No. 5,503,785; Swanson et al., U.S. Pat. No. 6,004,124; LaBossiere, et al., U.S. Pat. No. 7,604,470; Leavitt, U.S. Pat. No. 7,625,200; Batchelder et al., U.S. Pat. No. 8,439,665; and Swanson et al., U.S. Publication Nos. 2012/0018924 and 2012/0070523.

While illustrated with liquefier 50, extruder 20 may alternatively include a variety of different upstream liquefiers to generate the pressurized molten material, and provide the pressurized molten material to gear assembly 52, such as without limitation pellet and/or powder-fed screw-pumps, filament-fed screw-pumps, slug-fed pumps, and the like. In a further embodiment, liquefier 50 or its alternatives may be located even further upstream from print head 18, such as at a fixed location. In this embodiment, molten material may be fed to gear assembly 52 through a heated conduit. This is beneficial for removing liquefier 50 from print head 18, which can reduce consumable costs and print head weight.

Furthermore, as discussed below, while illustrated with a single liquefier 50, in alternative embodiments, extruder 20 may include multiple upstream liquefiers to simultaneously feed multiple consumable materials to gear assembly 52. This is beneficial for increasing the flow rate of the molten materials to gear assembly 52, such as doubling, tripling, or even quadrupling the flow rate (or more). Additionally, the use of multiple upstream liquefiers may also provide extrudates from gear assembly 52 having unique cross sections and/or material properties, as also discussed below.

Figure 3:
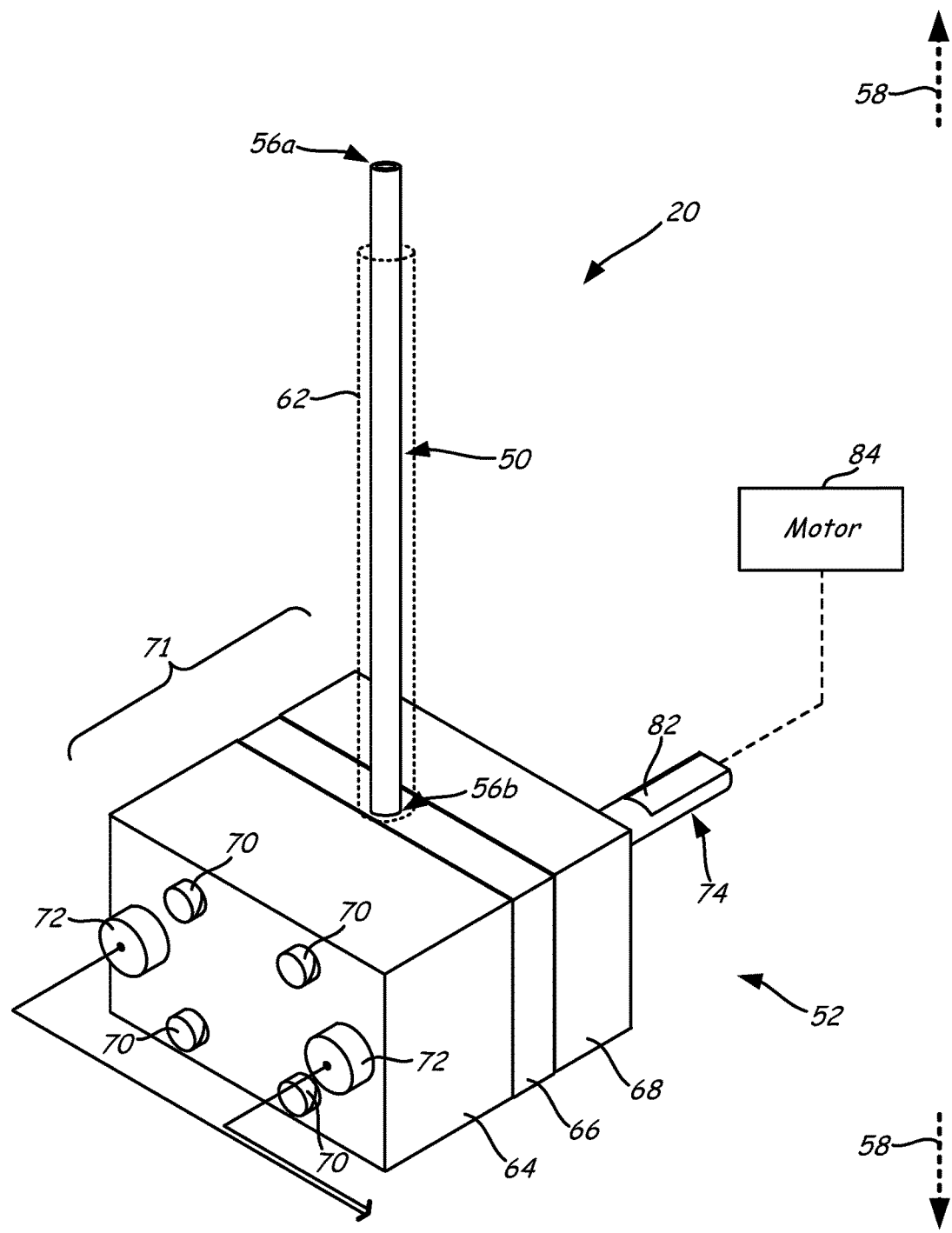
FIG. 3 is a front perspective view of the extruder.

As shown in FIGS. 2 and 3, gear assembly 52 is a downstream gear-based assembly that includes base casing 64, gear casing 66, and face casing 68, where gear casing 66 is secured between base casing 64 and face casing 68 with bolts 70 (collectively referred to as a casing assembly 71).

While gear assembly 52 is illustrated with a block-like geometry, in alternative embodiments, gear assembly 52 may have any suitable configuration, such for reducing weight and volumetric dimensions, and/or for aesthetic qualities.

In the shown example, gear assembly 52 also includes heating elements 72 extending through each of base casing 64, gear casing 66, and face casing 68. Heating elements 72 are a pair of electric heating elements configured to heat and maintain base casing 64, gear casing 66, and face casing 68 at an elevated temperature. This prevents the received molten filament materials from cooling down and/or solidifying within gear assembly 52 while print head 18 is printing.

As further shown, gear assembly 52 also includes drive gear 74 and idler gear 76, which respectively extend into openings 78 and 80 of face casing 68. As discussed below, drive gear 74 and idler gear 76 provide the flow-regulating functions (e.g., pumping or metering functions) for gear assembly 52, and extend through gear casing 66 and into base casing 64. In particular, drive gear 74 includes shaft 82 that extends beyond opening 78 of face casing 68 to operably connect with motor 84 (e.g., a step motor).

Drive gear 74 may be operably connected to motor 84 with a variety of mechanisms. For instance, shaft 82 may directly insert into the axis of motor 84, thereby allowing motor 84 to directly rotate drive gear 74. Alternatively, one or more additional shafts and/or gears may interconnect drive gear 74 and motor 84, such as to position motor 84 at a remote location from gear assembly 52. For example, motor 84 may also be located within housing 44 and connected to drive gear 74 with one or more additional shafts (e.g., parallel to axis 58) and gears, or other engagement mechanisms that transfer the rotational power of motor 84 to drive gear 74. This allows the drive motor 84 to be located at a distance from the nozzle with a simple direct drive, and facilitates its use in an heated environment which allows the nozzle to be positioned in the heated zone (e.g., in chamber 28), while motor 84 is on the cool side or unheated zone (e.g., outside of chamber 28).

Because the molten material is provided to gear assembly 52 under positive pressure, motor 84 may optionally be a low-torque motor to perform the flow-regulating functions. This allows motor 84 to be smaller in size and lighter in weight, thereby allowing print head 18 to be smaller and lighter. This can accordingly allow head gantry 36 to move print head 18 more effectively. In this low-torque motor 84 embodiment, controller assembly 38 commands motors 60 and 84 in a partially or fully synchronized manner to maintain suitable pressures for the molten material in gear assembly 52.

In a further alternative embodiment, motors 60 and 84 may be provided as a single motor that operates both drive mechanism 46 and drive gear 74. In this embodiment, controller assembly 38 may command the single motor to operate drive mechanism 46 and drive gear 74 in a synchronized manner.

Idler gear 76 is a second gear that is engaged with drive gear 74, but is otherwise capable of freely rotating within gear assembly 52. As such, the rotation of drive gear 74 counter rotates idler gear 76 within gear casing 66. This generates the pumping function for extruding the molten material in a controlled manner. Alternatively, idler gear 76 may be replaced by a second drive gear 76 that is rotated with a separate motor (not shown) that is commanded by controller assembly 38, preferably with synchronized operation with motor 82. In this case, the second drive gear 76 may also include a shaft that extends out of face casing 68, and interconnects the second drive gear 76 to the separate motor.

Figure 4:
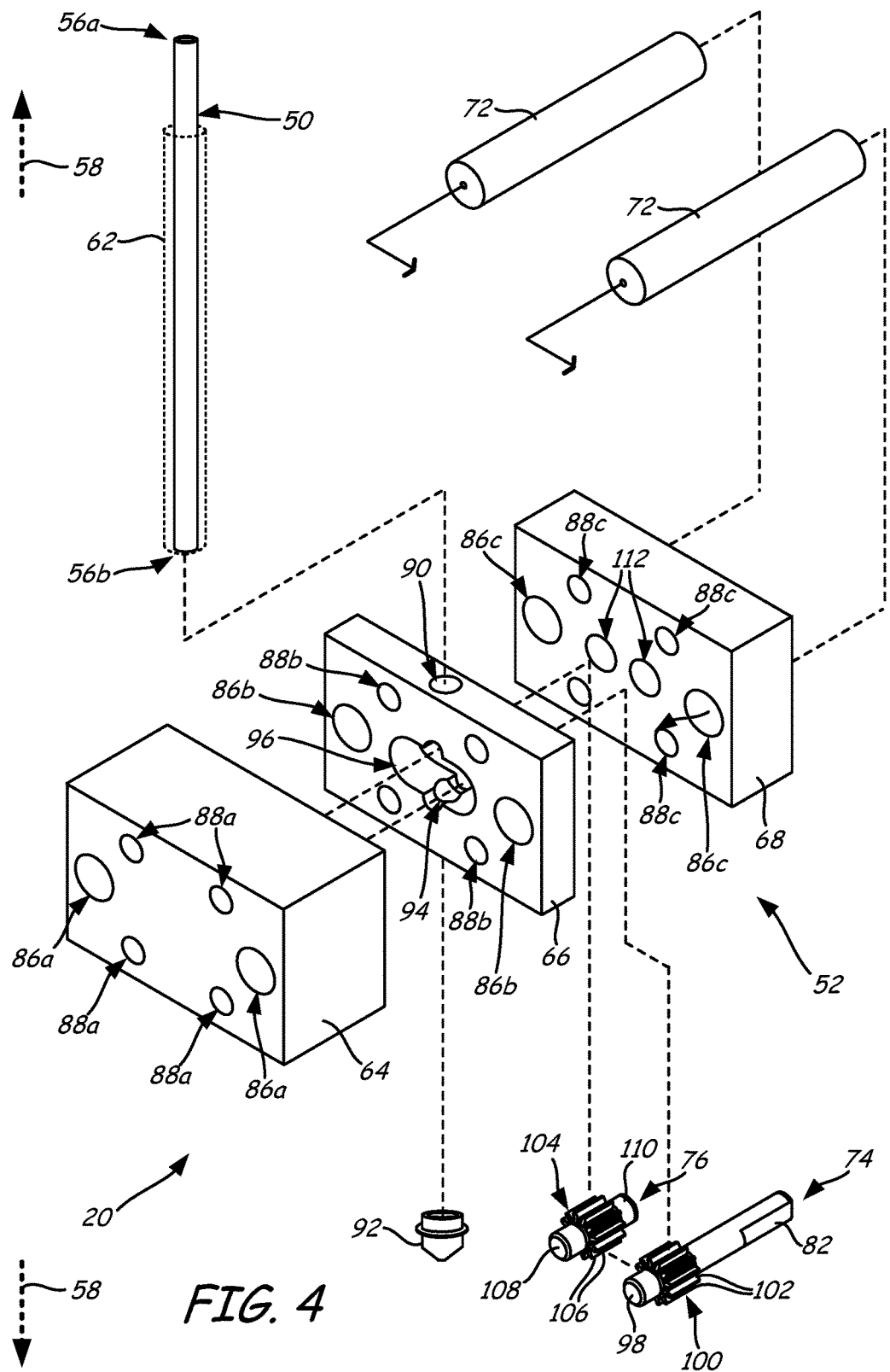
FIG. 4 is an exploded front perspective view of the extruder.

As shown in FIG. 4, base casing 64, gear casing 66, and face casing 68 respectively include lateral openings 86a, 86b, and 86c for receiving heating elements 72. Heating elements 72 are preferably received in lateral openings 86a, 86b, and 86c in a secure manner (e.g., frictional fit and/or set screws) to prevent heating elements 72 from dislodging or otherwise moving relative to casings 64, 66, and 68.

Base casing 64, gear casing 66, and face casing 68 also respectively include lateral openings 88a, 88b, and 88c for receiving bolts 70 (not shown in FIG. 4). Lateral openings 88a in base casing 64 are preferably threaded to threadedly engage with bolts 70. This allows bolts 70 to securely hold casings 64, 66, and 68 together. Alternatively, gear assembly 52 may also include external threaded nuts (not shown) to threadedly engage with bolts 70 outside of lateral openings 88a at base casing 64. In further alternatives, bolts 70 may extend through lateral openings 88a, 88b, and 88c from the opposing direction, such that face casing 68 may be threaded to threadedly engage with bolts 70.

As further shown in FIG. 4, outlet end 56b of liquefier 50 is connected to a top or inlet opening 90 of gear casing 66. Additionally, gear assembly 52 includes nozzle 92 connected to a bottom or outlet opening 94 of gear casing 66 (as best shown below in FIG. 9). Nozzle 92 is a small-diameter nozzle configured to extrude the molten material at a desired road width. Exemplary inner tip diameters for nozzle 92 include diameters ranging from about 125 micrometers (about 0.005 inches) to about 760 micrometers (about 0.030 inches). In some embodiments, nozzle 92 may include one or more recessed grooves to produce roads having different road widths, as disclosed in Swanson et al., U.S. Publication No. 2014/0048969, the contents of which are incorporated by reference.

Nozzle 92 may also have an axial channel with any suitable length-to-diameter ratio. For example, in some embodiments, nozzle 92 may have an axial channel with a length-to-diameter ratio to generate high flow resistance, such as a ratio of about 2:1 to about 5:1. In other embodiments, nozzle 92 may have an axial channel with a length-to-diameter ratio to generate lower flow resistance, such as ratios from about 2:1 to less than about 1:1. Accordingly, suitable length-to-diameter ratios for the axial channel of nozzle 92 may range from about 1:2 to about 5:1, where in some low-flow resistance embodiments, ratios ranging from about 1:2 to about 1:1 may be preferred.

Preferably, inlet opening 90 and outlet opening 94 are aligned with each other along longitudinal axis 58, and are in fluid communication with each other at an interior cavity 96 in gear casing 66. Interior cavity 96 is the region in which drive gear 74 and idler gear 76 engage for driving the molten material of filament 48 from liquefier 50 and inlet opening 90 to outlet opening 94 and nozzle 92, as explained below.

In addition to shaft 82, drive gear 74 also includes hub 98 and gear 100, where gear 100 includes teeth 102, and resides longitudinally between shaft 82 and hub 98. Similarly, idler gear 76 includes gear 104 having teeth 106, and resides longitudinally between hubs 108 and 110. Drive gear 74 and idler gear 76 may each be cast or machined from one or more metallic and/or polymeric materials capable of withstanding the elevated temperatures within gear assembly 52, such as stainless steel.

Figure 5:
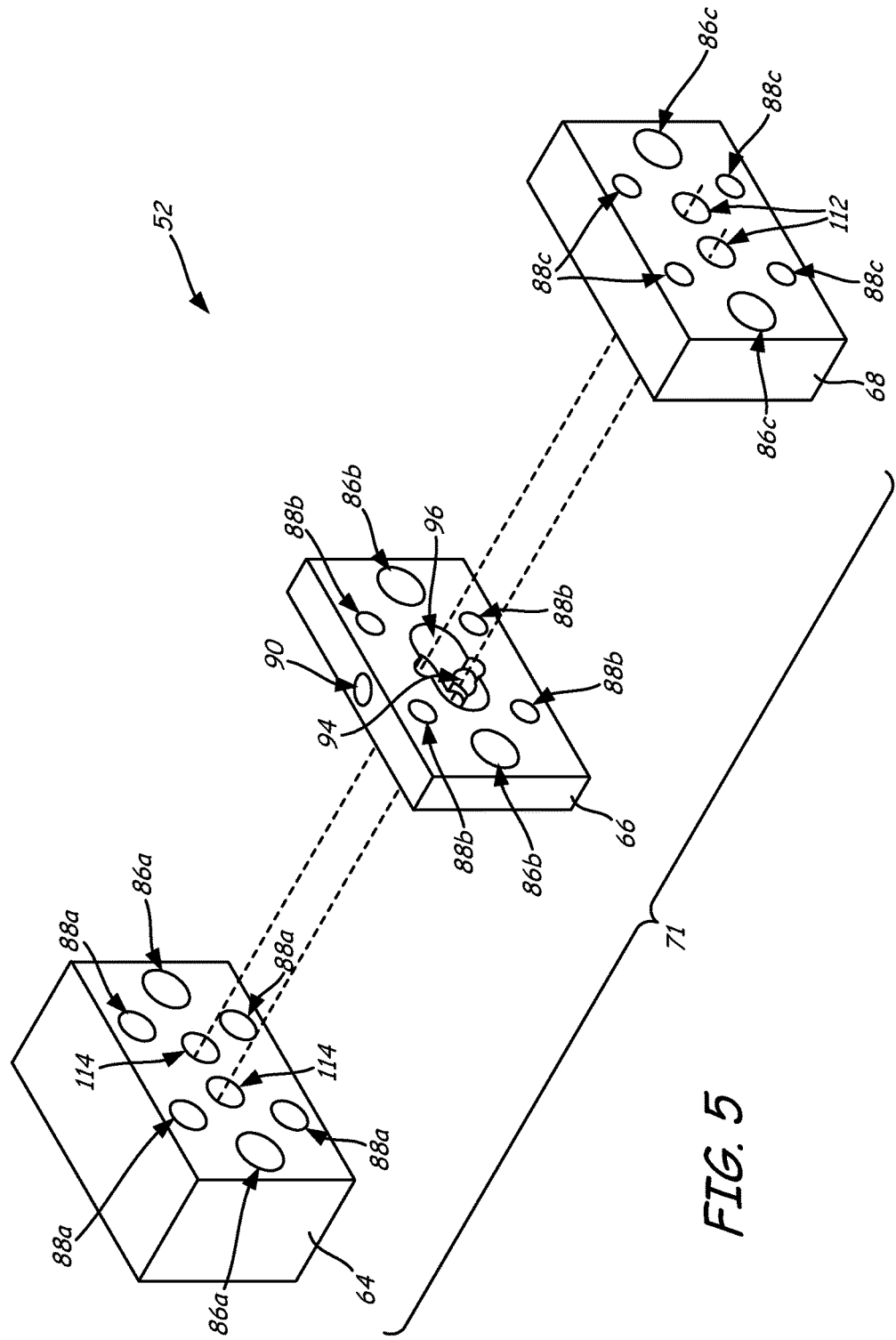
FIG. 5 is an exploded rear perspective view of casings of the downstream gear assembly.

Face casing 68 also includes hub openings 112, which, in the shown example, extend entirely through face casing 68. Alternatively, the hub opening 112 for idler gear 76 may only extend partially through face casing 68, such that the inserted idler gear 76 is not externally visible from the closed gear assembly 52. As shown in FIG. 5, base casing 64 also includes hub openings 114, which, in the shown embodiment, do not extend entirely through base casing 64. This can reduce any potential leakage of the molten material through base casing 64. However, in some alternative embodiments, hub openings 114 may extend entirely through base casing 64 (e.g., for ease of manufacturing).

Base casing 64, gear casing 66, and face casing 68 may be manufactured from one or more thermally-conductive, metallic materials, such as stainless steel, bronze alloys, and the like. Lateral openings 86a, 86b, 86c, 88a, 88b, and 88c, inlet opening 90, outlet opening 94, interior cavity 96, hub openings 112 and 114, and any other desired openings or features, may be produced during the castings steps and/or maybe machined into casings 64, 66, and 68, as desired.

During assembly, gear shaft 82 of drive gear 74 may be inserted through a first hub opening 112 of face casing 68, and hub 110 of idler gear 76 may be inserted into the other hub opening 112 of face casing 68. Gear casing 66 may be placed against face casing 68 such that drive gear 74 and idler gear 76 extend through interior cavity 96. In particular, gears 100 and 104 are positioned within interior cavity, preferably with a tight clearance with the walls of interior cavity 96. Base casing 68 may then be placed against the opposing side of gear casing 66 such that hubs 98 and 108 extend into hub openings 114.

Casings 64, 66, and 68 may then be secured together with bolts 70 inserted through lateral openings 86a, 86b, 86c. Hub openings 112 and 114 are preferably aligned with each other on opposing sides of interior cavity 96 to allow drive gear 74 and idler gear 76 to rotate relative to casings 64, 66, and 68 without undue frictional resistance, but also with tight clearances to minimize or eliminate any potential leakage of the molten material. Outlet end 56b of liquefier 50 may also be secured to inlet opening 90 of gear casing 66, and nozzle 92 may be secured to outlet opening 94 of gear casing 66. Heating elements 72 may also be inserted into and securely retained within lateral openings 88a, 88b, and 88c.

Figure 6A:
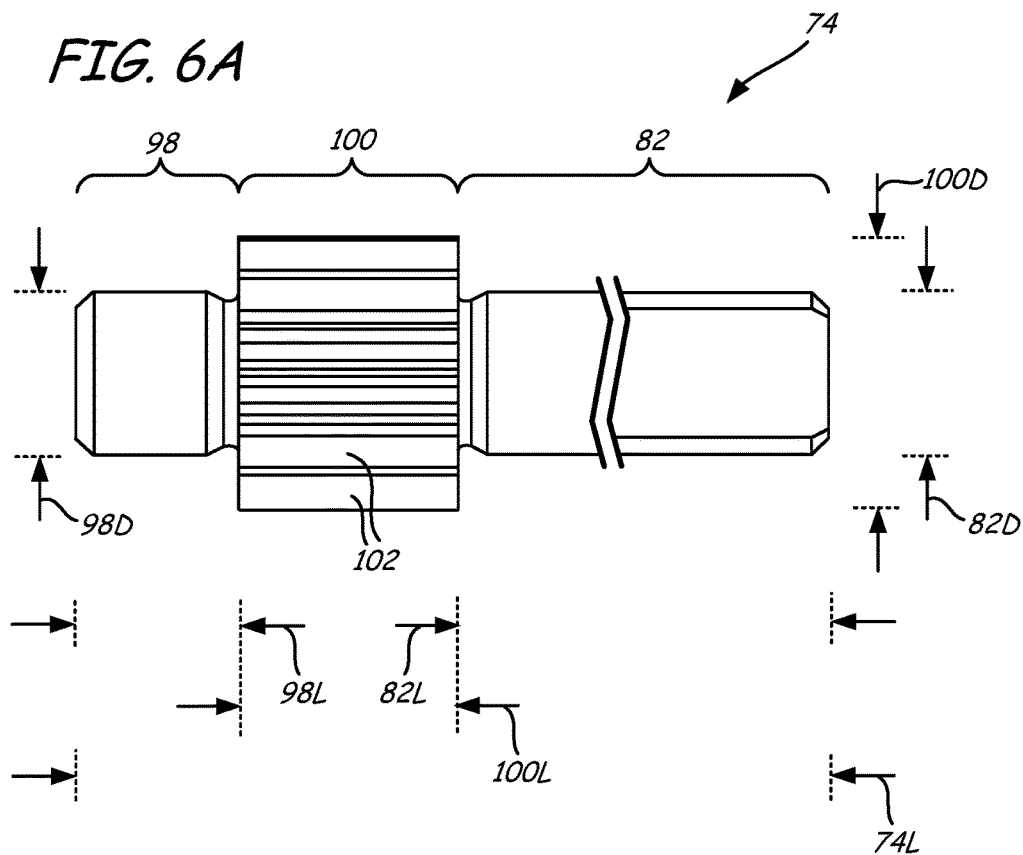
FIG. 6A is a side view of a drive gear of the downstream gear assembly.
Figure 6B:
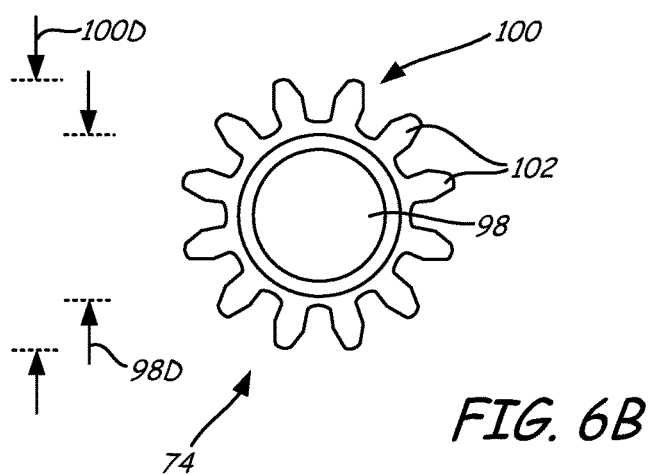
FIG. 6B is a front end view of the drive gear shown in FIG. 6A.
Figure 7A:
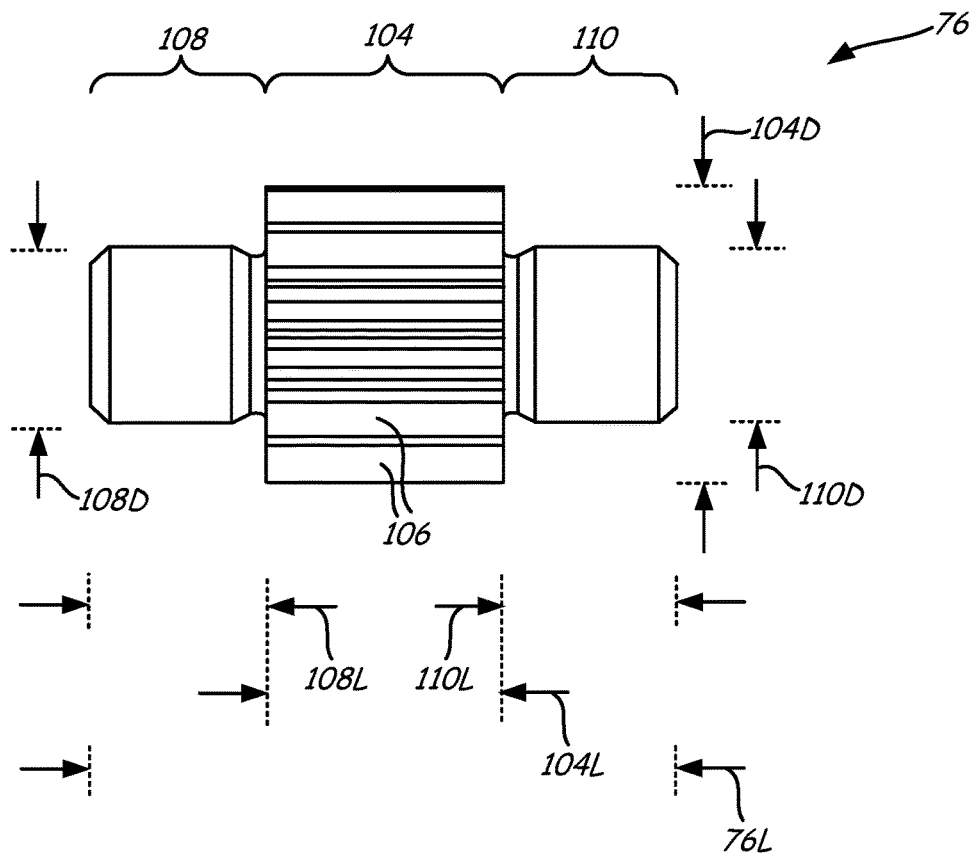
FIG. 7A is a side view of an idler gear of the downstream gear assembly.
Figure 7B:
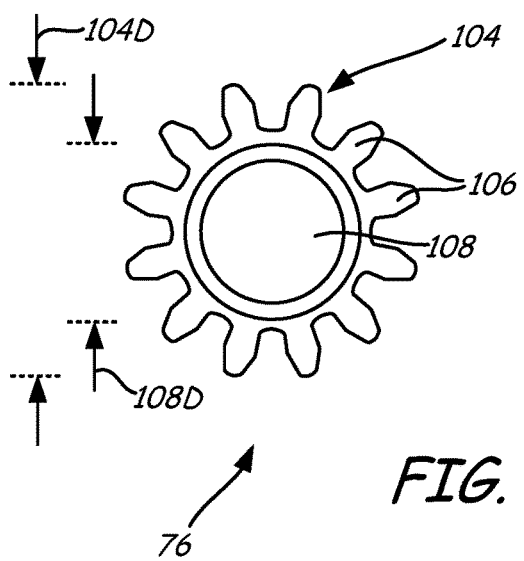
FIG. 7B is a front end view of the idler gear shown in FIG. 7A.

FIGS. 6A and 6B further illustrate drive gear 74, and FIGS. 7A and 7B further illustrate idler gear 76, each of which may have any suitable dimensions for use in gear assembly 52. In the shown embodiment, drive gear 74 and idler gear 76 have the same or substantially the same cross-sectional dimensions, with the only difference being shaft 82 of drive gear 74, which is longer than hub 110 of idler gear 76 for connection with motor 84.

FIGS. 6A and 6B show non-limiting examples of suitable dimensions for drive gear 74. As shown, length 82L for shaft 82 may range from about 0.3 inches to about 0.8 inches, length 98L for hub 98 may range from about 0.05 inches to about 0.2 inches, length 100L for gear 100 may range from about 0.1 inches to about 0.2 inches, and the overall length 74L for drive gear 74 is the sum of the above lengths 82L, 98L, and 100L, such as from about 0.6 inches to about 1.0 inch.

Similarly, outer diameters 82D and 98D respectively for shaft 82 and hub 98 may each range from about 0.05 inches to about 0.2 inches, and outer diameter 100D at the periphery of teeth 100 may range from about 0.15 inches to about 0.2 inches. In the shown embodiment, outer diameters 82D and 98D are the same or substantially the same, where the outer diameters refer to the maximum outer diameters, and exclude any chamfered or beveled edges. In alternative embodiments, outer diameters 82D and 98D may be different from each other.

FIGS. 7A and 7B correspondingly show non-limiting examples of suitable dimensions for idler gear 76. As shown, length 104L for gear 104 may range from about 0.1 inches to about 0.2 inches, lengths 108L and 110L respectively for hubs 108 and 110 may each range from about 0.05 inches to about 0.2 inches, and the overall length 76L for idler gear 64 is the sum of the above lengths 104L, 108L, and 110L, such as from about 0.3 inches to about 0.5 inches.

Outer diameter 104D at the periphery of teeth 106 may range from about 0.15 inches to about 0.2 inches, and outer diameters 108D and 110D respectively for hubs 108 and 110 may each range from about 0.05 inches to about 0.2 inches. In the shown embodiment, outer diameters 108D and 110D are the same or substantially the same, where the outer diameters refer to the maximum outer diameters, and excludes any chamfered or beveled edges.

In further embodiments, the dimensions of gears 100 and 104 are the same or substantially the same. In other words, in these embodiments, lengths 100L and 104L are the same or substantially the same, and outer diameters 100D and 104D are the same or substantially the same. However, in alternative embodiments, outer diameters 100D and 104D may be different from each other. In additional embodiments, the dimensions of hubs 98 and 108 are the same or substantially the same, such that lengths 98L and 108L are the same or substantially the same, and outer diameters 98D and 108D are the same or substantially the same.

Figure 8:
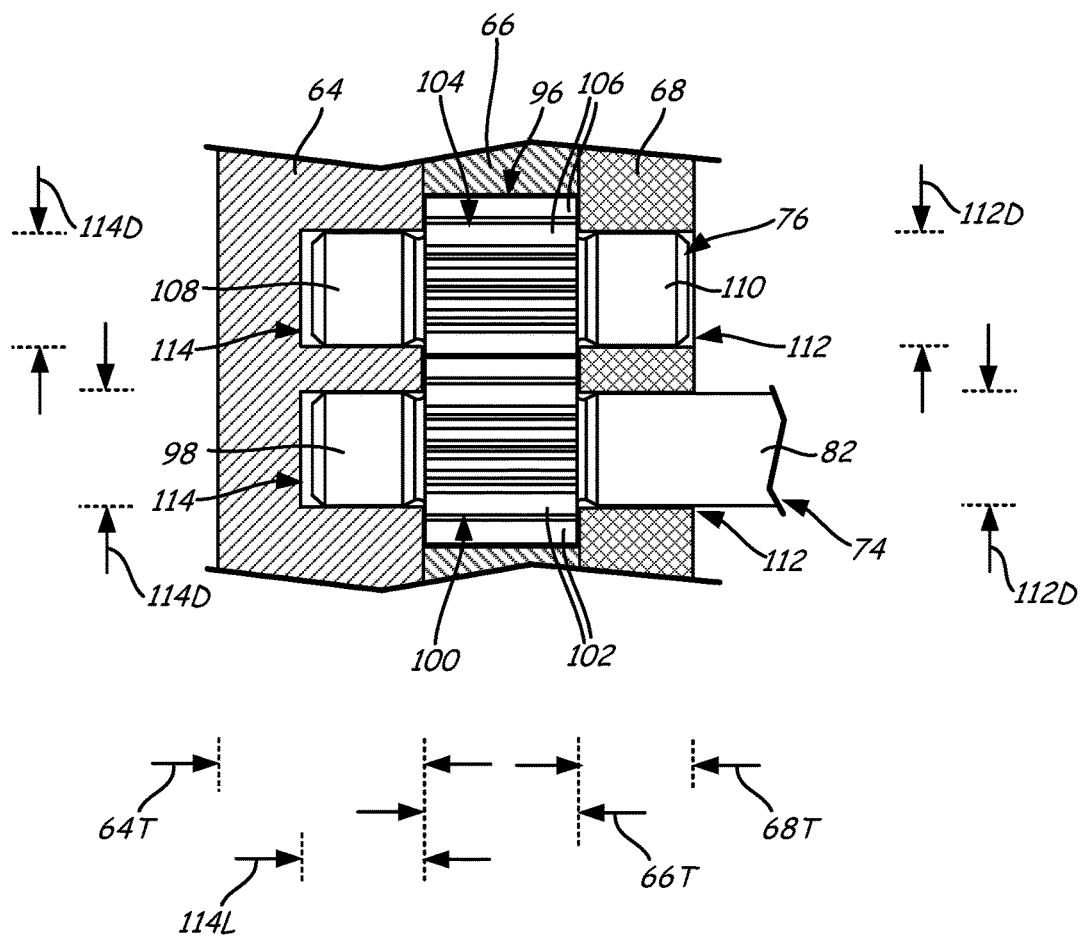
FIG. 8 is a top sectional view of the downstream gear assembly, illustrating an engagement of the drive gear and the idler gear.

Additionally, FIG. 8 shows gears 100 and 104 of drive gear 74 and idler gear 76 engaged with each within interior cavity 96 of gear casing 66. As shown, gear casing 66 preferably has a thickness 66T, at least at interior cavity 96, that is substantially the same as lengths 100L and 104L of gears 100 and 104, or slightly larger, to provide good lateral sealing properties between gears 100 and 104 and base casing 64 and face casing 68. Accordingly, examples of suitable dimensions for thickness 66T of gear casing 66 may range from about 0.1 inches to about 0.2 inches, and more preferably from greater than about 100% to about 105% of lengths 100L and 104L.

Base casing 64 may have any suitable thickness 64T depending on the desired dimensions of gear assembly 52, where thickness 54T is preferably greater than a lengths 114L of hub openings 114. Hub openings 114 are 64T sized to accommodate hubs 98 and 108 in a manner that allows hubs 98 and 108 to rotate without undue resistance, while also providing good sealing properties for interior cavity 96, and positioning gears 100 and 104 close to each other. Examples of suitable lengths 114L for hub openings 114 may range from about 0.05 inches to about 0.2 inches, and more preferably include those greater than 100% of lengths 98L and 108L. Examples of suitable inner diameters 114D for hub openings 114 may range from about 0.05 inches to about 0.2 inches, and more preferably range from greater than about 100% to about 105% of diameters 98D and 108D.

Correspondingly, face casing 68 may have any suitable thickness 68T depending on the desired dimensions of gear assembly 52. Examples of suitable thickness 68T for face casing 68 may range from about 0.05 inches to about 0.2 inches. Hub openings 112 are preferably sized to accommodate shaft 82 and hub 110 in a manner that allows shaft 82 and hub 110 to rotate without undue resistance, while also providing good sealing properties for interior cavity 96. Examples of suitable inner diameters 112D for hub openings 112 may range from about 0.05 inches to about 0.2 inches, and more preferably range from greater than about 100% to about 105% of diameters 82D and 110D.

Figure 9:
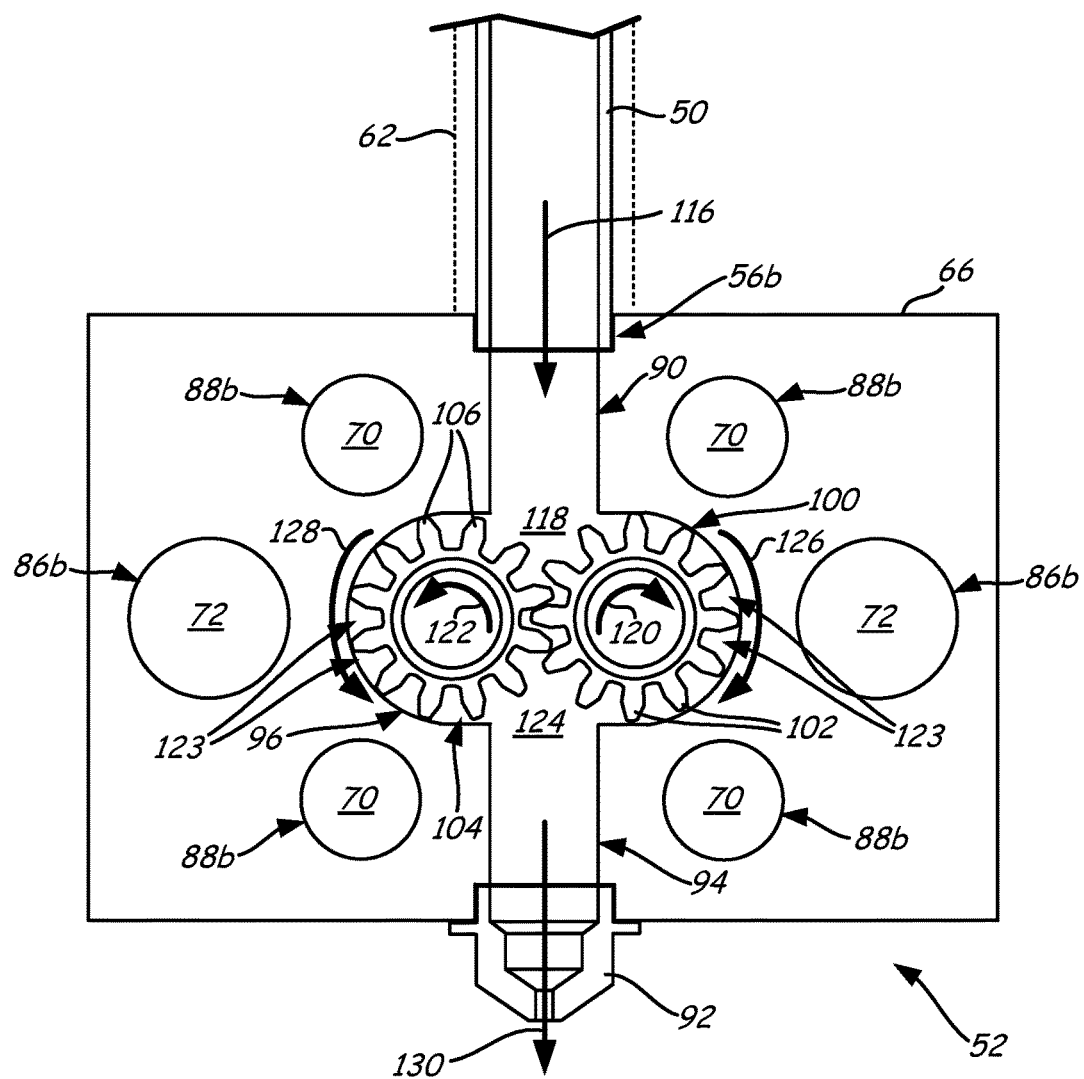
FIG. 9 is a front schematic view of the extruder, further illustrating the engagement of the drive gear and the idler gear.

FIG. 9 further illustrates the engagement of gears 100 and 104 in interior cavity 96 of gear casing 66. During a printing operation, controller assembly 38 (shown in FIG. 1) commands drive mechanism 46 (via motor 60) (shown in FIG. 2) to feed successive segments of filament 48 into inlet end 56a of liquefier 50 (shown in FIGS. 2-4). As filament 48 passes through liquefier 50 in the direction of arrow 54, heater assembly 62 thermally melts the received successive segments, where the molten portion of the filament material forms a meniscus around the unmelted portion of filament 48.

The downward movement of filament 48 functions as a viscosity pump to pressurize the molten material and force it from liquefier 50 into gear assembly 52. In particular, the pressurized molten material flows from outlet end 56b of liquefier 50 into inlet opening 90 of gear casing 66, as depicted by arrow 116. This fills an upper region 118 of interior cavity 96 and inlet opening 90 with the pressurized molten material. The engaged teeth 102 and 106 of gears 100 and 104 prevent the received molten material from flowing directly down between gears 100 and 104 into outlet opening 94, unless or until the gears are rotated.

Controller assembly 38 may direct motor 84 to rotate drive gear 74 in the direction of arrow 120, which causes teeth 102 of gear 100 to rotate in the same direction. The engagement between teeth 102 and 106 accordingly counter rotates gear 104 (and idler gear 76) in the direction of arrow 122. The molten material is then carried around gears 100 and 104 in the interstitial spaces between teeth 102 and 106 and the walls of interior cavity 96 (referred to as interstitial spaces 123) to a lower region 124 of interior cavity 96, as depicted by arrows 126 and 128. The continued driving of the molten material around gears 100 and 104 in this manner forces the molten material in lower region 124 downward through outlet opening 94 and nozzle 92 to extrude the molten material in a controlled manner, as depicted by arrow 130.

As can be appreciated, when printing 3D part 22 or support structure 24, the extrudate flow from nozzle 92 is rarely held at a constant, steady-state rate. Instead, the extrudate flow rate is typically being changed repeatedly to accommodate a variety of different tool path conditions, such as road start accelerations, road stop decelerations, cornering decelerations and accelerations, road width variations, and the like.

These flow rate changes are traditionally controlled by adjusting the feed rate of filament 48 into liquefier 50 with drive mechanism 46, based on drive commands from controller assembly 38. This correspondingly adjusts the pressure generated by the viscosity-pump action on the molten material. However, when controller assembly 38 commands drive mechanism 46 to change the feed rate of filament 48 into liquefier 50, there is a time response delay between the signal command and when the extrusion rate from nozzle 56 actually changes. This is due to response limitations in the motor of drive mechanism 46 and the viscosity-pump action in liquefier 50.

Gear assembly 52, however, does not directly rely on a viscosity-pump action from filament 48 for regulating the flow of the molten material. Instead, gear assembly 52 provides a gear-based mechanism located close to nozzle 92 for regulating the flow of the molten material in a highly-controlled manner. In particular, gears 100 and 104 can drive precise volumes of the molten material in the interstitial spaces 123 between teeth 102 and 106 and the walls of interior cavity 96, based on the rotation of gears 100 and 104. The small pressurized volumes of interstitial spaces 123 can also decrease ooze and increase control of melt flow from nozzle 92 because of the relative low volumes of the molten material within each interstitial space 123, resulting in lower levels of thermal expansion. These features can provide a high level of dynamic control over the volumetric flow rates of the molten material.

Figure 10:
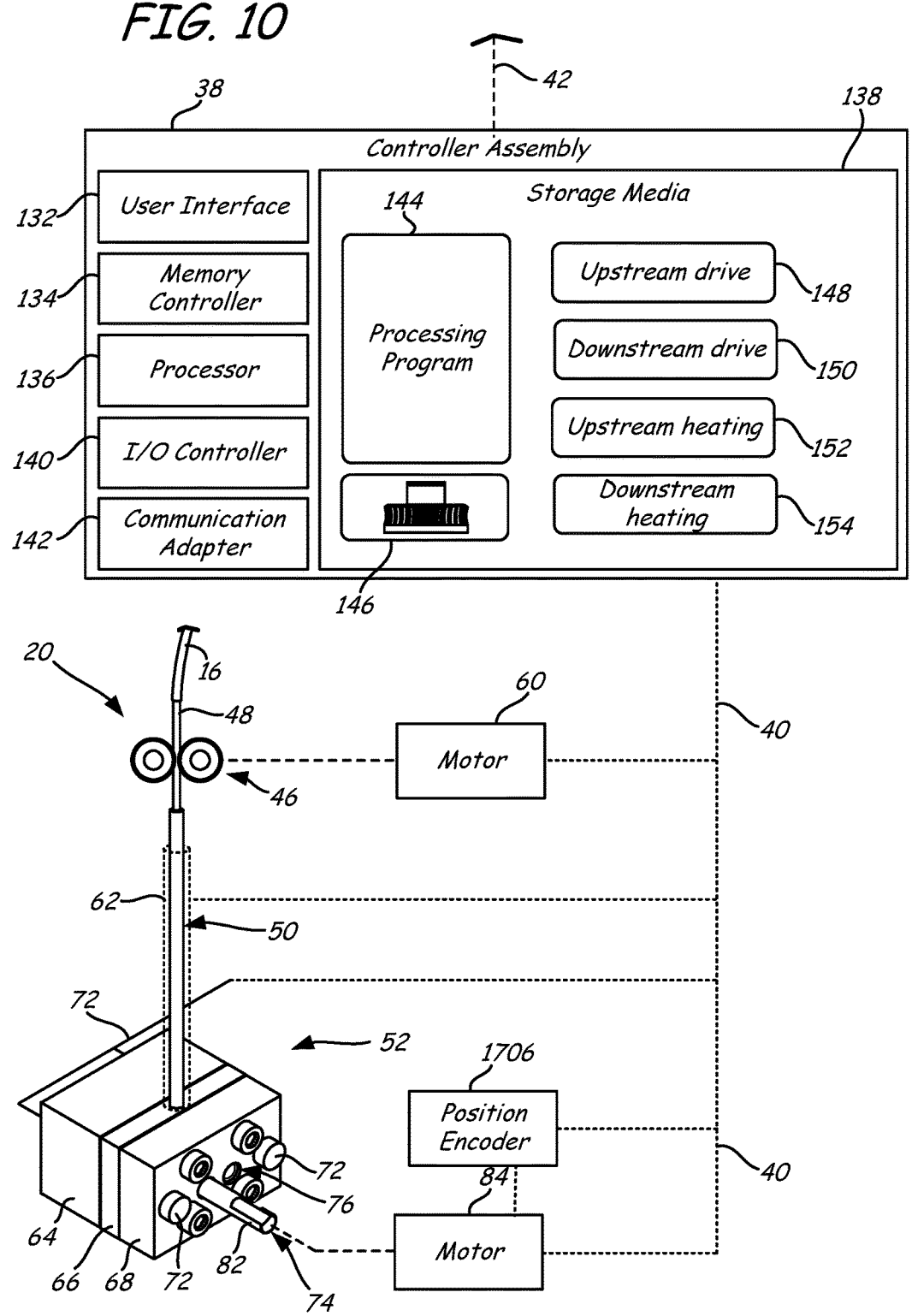
FIG. 10 is a schematic illustration of a controller assembly of the additive manufacturing system in use with the print head.

FIG. 10 illustrates an example architecture for controller assembly 38 in use with extruder 20 and drive mechanism 46. Controller assembly 38 may include any suitable computer-based hardware, such as user interface 132, memory controller 134, processor 136, storage media 138, input/output (I/O) controller 140, and communication adapter 142. Controller assembly 38 may also include a variety of additional components that are contained in conventional computers, servers, media devices, and/or printer controllers.

User interface 132 is a user-operated interface (e.g., keyboards, touch pads, touch-screen displays, display monitors, and other eye, voice, movement, or hand-operated controls) configured to operate controller assembly 38. Memory controller 134 is a circuit assembly that interfaces the components of controller assembly 38 with one or more volatile random access memory (RAM) modules of storage media 138. Processor 136 is one or more computer-processing units configured to operate controller assembly 38, optionally with memory controller 134. For instance, processor 136 may include one or more microprocessor-based engine control systems.

Storage media 138 is one or more internal and/or external data storage devices, storage hardware or computer storage media for controller assembly 38, such as volatile RAM modules, read-only memory modules, optical media, magnetic media (e.g., hard disc drives), solid-state media (e.g., FLASH memory and solid-state drives), analog media, and the like. Storage media 138 may retain an executable copy of processing program 144, a tool path generator and other control software, and may retain one or more digital models to be printed with system 10 and/or tool paths for printing digital models, such as digital model 146. Controller assembly 38 may receive digital model 146 over communication line 42, where digital model 146 may have any file format configured or configurable by controller assembly 38 for 3D printing.

Controller assembly 38 may also use feedback to dynamically control the print head, and the like. I/O controller 140 is a circuit assembly that interfaces memory controller 134, processor 136, and storage media 138 with various input and output components of controller assembly 38, including communication adapter 142. Communication adapter 142 is one or more wired or wireless transmitter/receiver adapters configured to communicate over communication lines 40 and 42.

As briefly mentioned above, controller assembly 38 can use gear assembly 52 in a variety of manners to controllably extrude the molten material from nozzle 92. For instance, controller assembly 38 may generate synchronized commands for motors 60 and 84 based on the desired tool path flow rates to be used. Similarly, controller assembly 38 may generate the commands to heat assembly 62 and heating elements 72 depending on the particular thermal profiles desired along liquefier 50 and gear assembly 52. Controller assembly 38 may store these commands on storage media 138 as one or more data files (e.g., data files 148, 150, 152, and 154), and may use these data files 148, 150, 152, and/or 154 to generate the tool path instructions for printing each sliced layer with system 10.

Furthermore, the data files 148 and 150 may depend on how gear assembly 52 is intended to operate. As discussed above, gear assembly 52 may be operated as a "gear pump" and/or as a "gear brake", and controller assembly 38 may optionally switch gear assembly 52 back-and-forth between the operating states, if desired.

In the gear pump embodiment, gear assembly 52 may receive the pressurized molten material from liquefier 50 at a lower positive pressure to prevent leakage from gear assembly 52. In this case, motor 84 applies torque to rotate shaft 82 in the direction of arrow 120 to drive the molten material to nozzle 92. The viscosity-pumping action of liquefier 50 may provide the molten material to gear assembly 52 with enough positive pressure to prevent starvation of gear assembly 52. As mentioned above, controller assembly 38 may command motors 60 and 84 to operate in partially or fully synchronized manner to maintain sufficient pressures of the molten material in gear assembly 52. In comparison, gear assembly 52 itself preferably regulates the extrusion of the molten material from nozzle 92 in a controlled manner.

Alternatively, in the gear brake embodiment, gear assembly 52 can receive the molten material of filament 48 at a relatively higher positive pressure, where motor 84 operably applies resistive torque to shaft 82 to prevent shaft 82 from rotating under the pressurized flow of the molten material. In this case, when extrusion is desired, controller assembly 38 commands motor 84 to controllably release the resistive torque on shaft 82, which allows gears 100 and 104 to rotate and carry set volumes of the molten material to nozzle 92.

In each of these embodiments, the flow of the molten material to nozzle 92 is dictated by the rotations of gears 100 and 104, which regulate an accurate level of dynamic flow control over the extrusion rates. Additionally, controller assembly 38 may command gear assembly 52 (e.g., via motor 84) to perform particular actions at acceleration and deceleration phases of a tool path. For instance, controller assembly 38 may command motor 84 to reverse the rotation on drive gear 74 at the end of a tool path to perform a suck-back operation to reduce or eliminate oozing or melt flow issues. In some embodiments, the oozing or melt flow issues can be reduced or eliminated without cooling down gear assembly 52 or nozzle 92. In some cases, liquefier assembly 20 can be operated without requiring a purge or pre-condition operation between uses (i.e., liquefier assembly 20 can be less dependent on its extrusion history compared to standard liquefiers).

Figure 11:
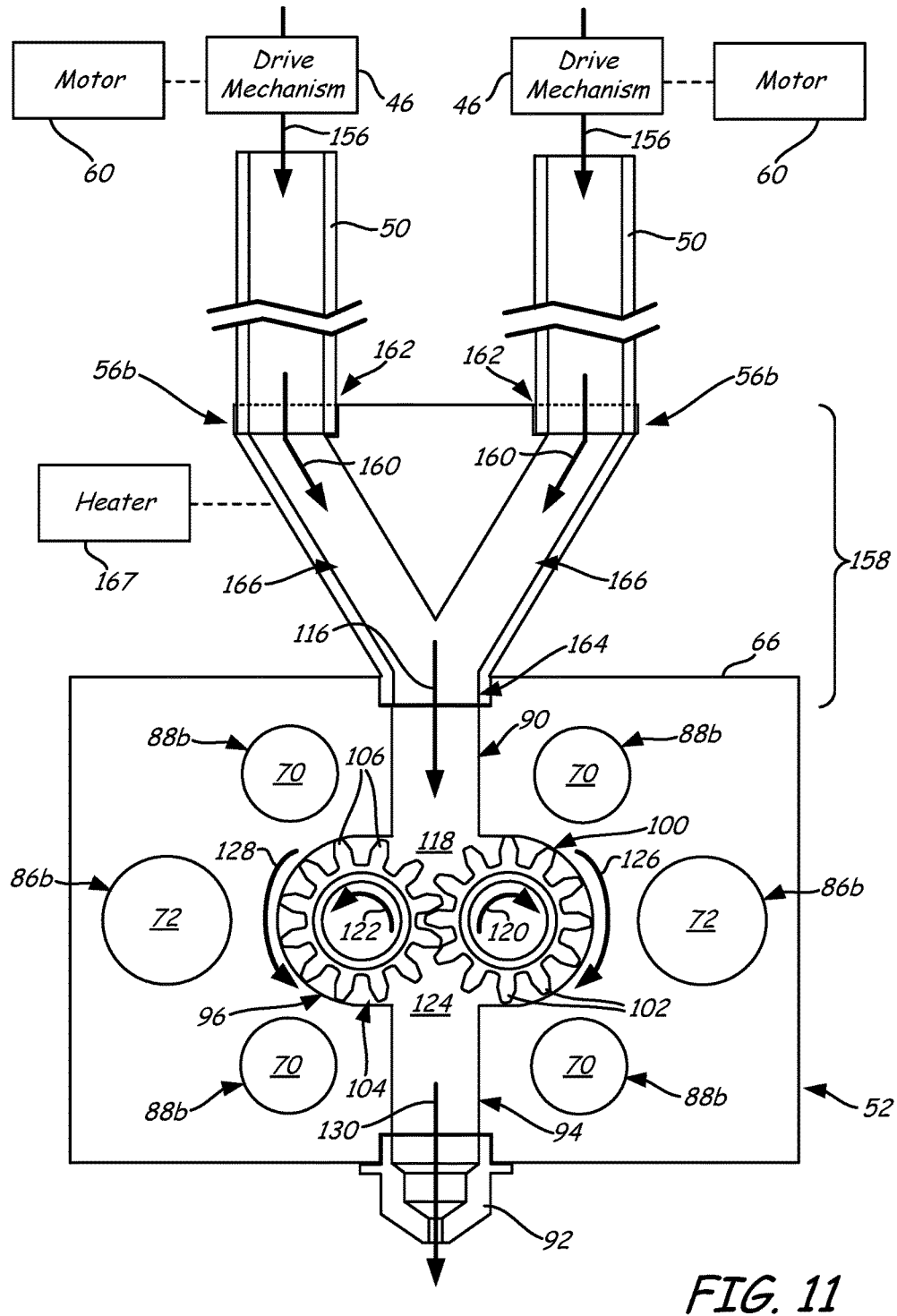
FIG. 11 is a front schematic view of an alternative extruder of the present disclosure, which includes multiple upstream liquefiers.

The downstream gear assembly 52 may also be used with multiple upstream liquefiers. For example, as shown in FIG. 11, gear assembly 52 may receive pressurized molten materials from a pair of liquefiers 50, where each liquefier 50 may receive an individual filament 48 from a dedicated drive mechanism 46 and motor 60 (or from a single combined motor 60). In this embodiment, controller assembly 38 may operate motors 60 together to feed a pair of filaments 48 to the parallel liquefiers 50, as depicted by arrows 156. This can be performed to effectively double the feed rate of the consumable material.

Each filament 48 is melted in its respective liquefier 50 (e.g., via a heating assembly 62, not shown), and then driven under the viscosity-pump action into a manifold 158, as depicted by arrows 160. Controller assembly 38 may operate the separate motors 60 in a partially or fully synchronized manner, allowing the pressurized flows to be the same or independently selected. For example, controller assembly 38 may direct the pressurized flows of the molten materials from each liquefier 50 to be the same or substantially the same as each other (i.e., about a 1:1 volumetric flow rate ratio), to be proportional but different from each other (e.g., about a 2:1 volumetric flow rate ratio), and/or to vary dynamically relative to each other, as desired.

Manifold 158 is an intermediate assembly configured to direct the pressurized molten materials from each liquefier 50 into inlet opening 90, as shown. As such, manifold includes two (or more) inlet ports 162 for engagement with outlet ends 56b of liquefiers 50, an outlet port 164 for engagement with inlet opening 90 of gear casing 66, and multiple merging conduits 166 interconnecting inlet ports 162 and outlet port 164.

The number of inlet ports 162 and conduits 166 may vary depending on the desired number of liquefiers 50 to be used. Examples of suitable numbers of inlet ports 162 and conduits 166 for manifold 158 range from two to ten, and in some embodiments, from two to six, and in other embodiments, from two to four. In some preferred embodiments, manifold 158 is also heated, such as with a heater assembly 167 to assist in keeping the molten material heated while flowing from liquefiers 50 to gear assembly 52.

If desired, manifold 158 may also include one or more mixing units, such as an active or static mixer, to mix the received molten materials before they are delivered to gear assembly 52. However, when receiving the molten materials from multiple upstream liquefiers 50, gear assembly 52 can generate extrudates from nozzle 92 that have unique cross sections. In particular, it has been found that the molten material flows that enter inlet opening 90, which are not pre-mixed, retain their unmixed cross sections after passing around gears 100 and 104.

For example, as shown in FIGS. 12A and 12B, when an unmixed inlet flow of a pair of molten materials 168 and 170 enter inlet opening 90 and upper region 118 of interior cavity 96, the majority of the material driven by gear 100 will be material 170, and the majority of the material drive by gear 104 will be material 168. When the driven materials 168 and 170 reconverge at lower region 124 of interior cavity 96, they will substantially retain their separate volumes, subject to a small amount of mixing at their interface 172. These separate volumes will then also continue through the extrusion at nozzle 92, such that the deposited roads also have the substantially separate cross sections.

This phenomenon is believed to be due to the low levels of shear and turbulence that the molten materials are subjected to in gear assembly 52. This can provide extrudates with unique properties due to the substantial separation of materials. For example, one side of a deposited road of the extrudate may have a first color, and the other side of the deposited road may have a second color. This can produce roads that are readily recognizable due to their dual-color profiles.

This phenomenon can also be further used to tailor the physical, chemical, and thermal properties of the deposited roads. For instance, the deposited roads may be produced with pairs of amorphous and semi-crystalline materials that retain substantially separate cross sections. Other embodiments may incorporate pairs of different soluble support materials having different strengths and solubilities. Further embodiments may pair electrically-conductive materials with electrically-insulating materials. A variety of other material combinations may also be used.

FIGS. 13A and 13B illustrate a variation of the material pairing with gears 100 and 104. It has also been found that when the unmixed inlet flows are oriented orthogonal to those shown in FIGS. 12A and 12B, such that flows 168 and 170 each pass around each gear 100, and each pass around gear 104, when the driven materials 168 and 170 reconverge at lower region 124 of interior cavity 96, they will also substantially retain their separate volumes, subject to a small amount of mixing at their interface 174. In this case, interface 174 is orthogonal to interface 172 (shown above in FIGS. 12A and 12B).

As can be appreciated, the results from FIGS. 12A, 12B, 13A, and 13B can be also applied to a four-material arrangement. In this case, the resulting extrudate will have cross-sectional quadrants of the original materials, subject to small amounts of mixing at their interfaces. As such, gear assembly 52 is capable of producing extrudates with material unique properties that can be tailored to a variety of individual needs.

Figure 14:
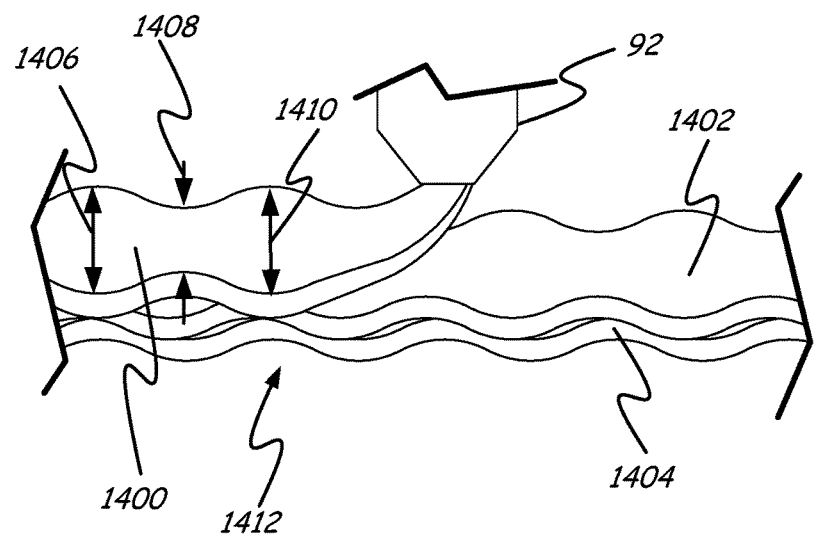
FIG. 14 is a perspective view of a nozzle depositing molten material with ripples in the bead width.

Pumps and brakes sometimes suffer from variations or pulses in the volume or flow of their output. Thus, the amount of material output by the pump or brake increases and decreases over time even when the pump or brake is operating at a constant speed. Within an additive manufacturing system, such variations in the output of the pump or brake result in bead width variations, also referred to as "ripple", in the deposited material. For example, in the perspective view of FIG. 14, nozzle 92 of gear assembly 52 deposits a layer 1400 of molten material on a substrate consisting of a previously deposited layer 1402, which in turn is deposited on a second previously deposited layer 1404. As shown in exaggerated form in FIG. 14, each of the deposited layers have a bead width that ripples due to variations or pulsing in the output of the material from nozzle 92. For example, layer 1400 includes a bead width that varies from a wide width 1406 to a narrow width 1408 and back to a wide width 1410. Wide widths 1406 and 1410 are formed when the volume or flow of the material extruded by nozzle 92 is at a higher value and narrow width 1408 is formed when the volume or flow of the material extruded by nozzle 92 is at a lower value. As shown in FIG. 14, the variations in the bead width for different layers typically do not align with each other resulting in a rough surface 1412.

Figure 15:
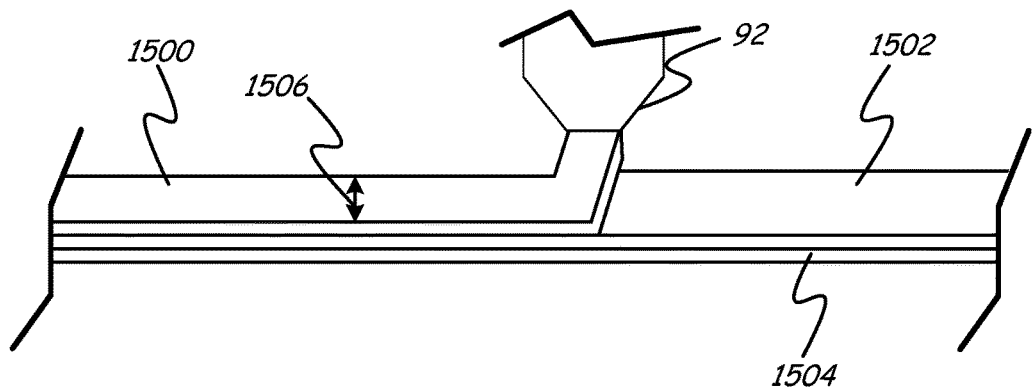
FIG. 15 is a perspective of a nozzle depositing molten material while driving an extruder with a time-varying signal.

In accordance with several embodiments, a method and system are provided that reduce the variations in the bead width. In particular, the method and system modify a command signal used to control motor 84 of gear assembly 52 so as to compensate for variations in the volume of material output by nozzle 92 that would otherwise occur due to the mechanical features of extruder 20. In particular, a time-varying signal is added to or incorporated in the command signal so that nozzle 92 extrudes layers with reduced bead-width ripple such as layers 1500, 1502 and 1504 shown in the perspective view of FIG. 15. As shown in FIG. 15, each of the layers has a substantially constant bead width such as substantially constant bead width 1506 of layer 1500. Note that in these embodiments, the different layers do not have to have the same bead width but along sections of a single deposited layer, the bead width is substantially uniform and does not vary as much as when the time-varying signal is not incorporated in the command signal.

Figure 16:
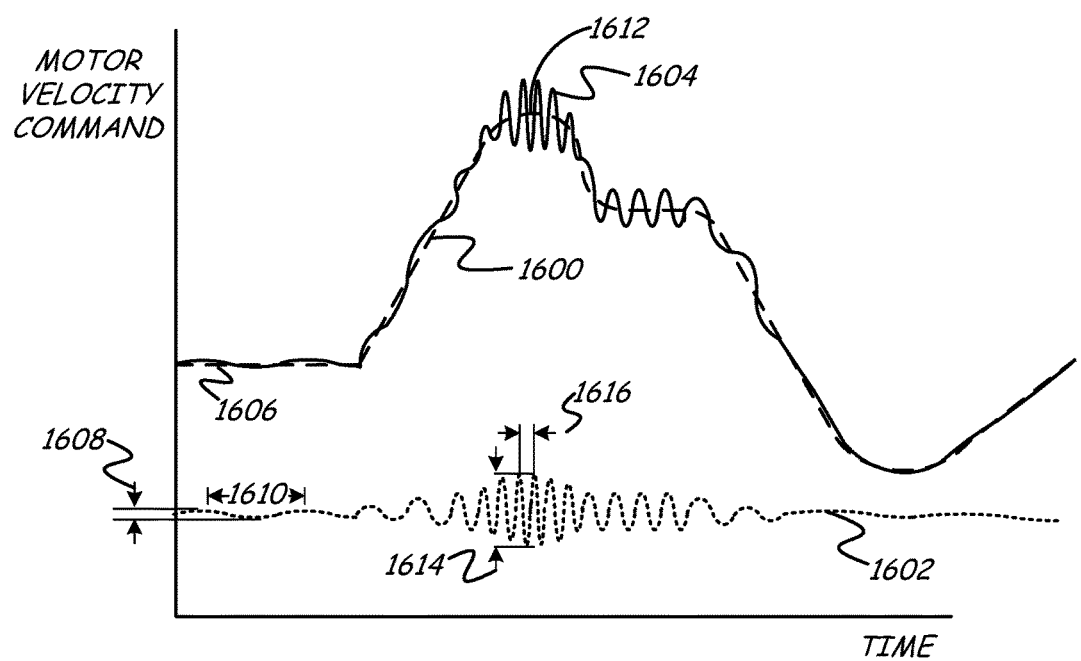
FIG. 16 is a graph of a command signal, a velocity component of the command signal and a time-varying component of the command signal.

In many embodiments, incorporating or adding the time-varying signal to the command signal involves incorporating or adding the time-varying signal to a velocity component of the command signal. FIG. 16 provides a graph showing a velocity component 1600 (dashed line) and a time-varying component 1602 (dotted line) of a motor command signal 1604 (solid line). Velocity component 1600 changes the rate at which extruder 20 deposits material through nozzle 92 based on the relative velocity and acceleration between nozzle 92 and the surface area (such as a substrate, previously deposited layer or tray) that is receiving the deposited layer. This relative velocity and acceleration can be due to movement of the component that deposits the material, such as nozzle 92, and/or due to movement of the surface area (substrate/existing layers/tray) that will receive the deposited material.

Time-varying component 1602 changes the speed at which a pump member or brake member, such as drive gear 74 and idler gear 76, move to reduce variations in the volume of material output by the extruder. For example, in embodiments where the pump member or brake member rotates, the time-varying component changes the rate of rotation of the pump member or brake member. Time-varying component 1602 has a frequency and an amplitude that both change over time. In one embodiment, as velocity component 1600 increases, both the amplitude and the frequency of time-varying component 1602 increase. For example, when velocity component 1600 is at a relatively low level 1606, time-varying component 1602 has a relatively small amplitude 1608 and a relatively low frequency as indicated by a relatively long wavelength 1610 in FIG. 16. However, when velocity component 1600 is at higher level 1612, time-varying component 1602 has a relatively large amplitude 1614 and a relatively high frequency as indicated by a relatively short wavelength 1616 in FIG. 16.

In FIG. 16, velocity component 1600, time-varying component 1602, and motor command signal 1604 are depicted as continuous signals. However, those skilled in the art will recognize that velocity component 1600 and time-varying component 1602 can be constructed of discrete values that are individually added together to form discrete values for motor command signal 1604.

Figure 17:
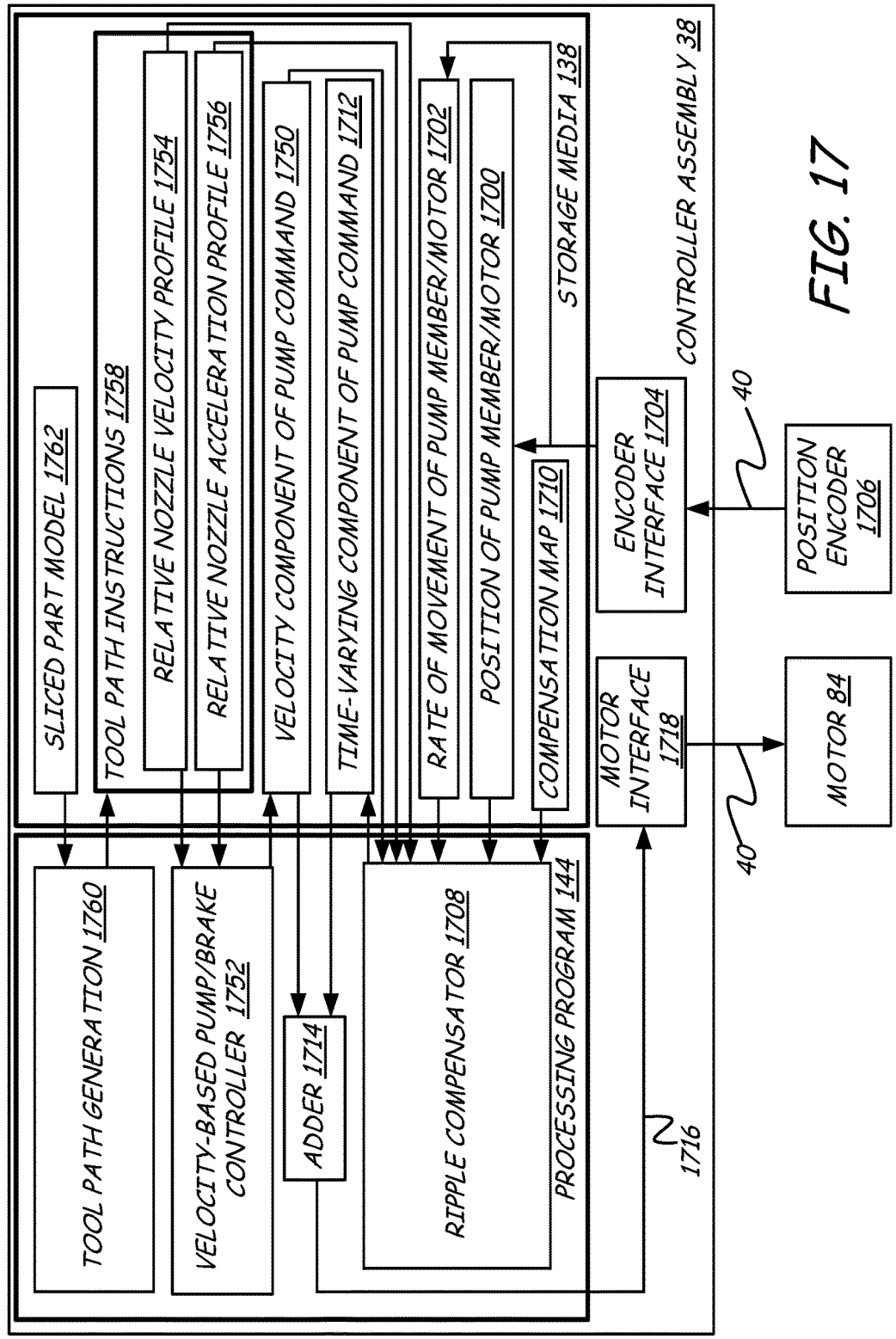
FIG. 17 is an expanded block diagram of controller assembly 38.

FIG. 17 provides an expanded block diagram of controller assembly 38 showing the components used to generate a motor command signal 1716 that incorporates both a velocity component, such as velocity component 1600, and a time-varying component, such as time-varying component 1602.

As shown in the block diagram of FIG. 17, velocity component 1750 of the motor command signal 1716 is formed by a velocity-based pump/brake controller 1752 of processing program 144. Pump/brake controller 1752 forms the velocity component based on a relative nozzle velocity profile 1754 and a relative nozzle acceleration profile 1756 found in tool path instructions 1758 stored on storage media 138. Relative nozzle velocity profile 1754 describes the relative velocity between nozzle 92 and the area (substrate, previously deposited layers/tray) where the nozzle is depositing material. This relative velocity can be due to movement of nozzle 92, movement of the area or a combination of both. Relative nozzle acceleration profile 1756 describes the relative acceleration between nozzle 92 and the area where the nozzle is depositing material and can be due to the acceleration of nozzle 92, the acceleration of the area or a combination of both.

Velocity profile 1754 and acceleration profile 1756 are generated by tool path generation 1760 of processing program 144 based on a sliced part model 1762 that defines paths or roads where material will be deposited for each layer of the part. In accordance with one embodiment, the relative nozzle velocities change at different portions of the part to allow for faster building of the part. For example, the nozzle can be moved faster along straight portions of the part but in general must be slowed around curved portions of the part. As the relative nozzle velocity changes, the rate of the flow of material must also change to maintain the bead width. If the relative nozzle velocity increases without the output flow rate of nozzle 92 increasing, the bead width will thin. Similarly, if the relative nozzle velocity decreases without the output flow rate of nozzle 92 decreasing, the bead width will thicken.

Because there is a delay between when the motor command is sent and when the flow rate of the material changes, the pump/brake controller 1752 also takes into consideration relative nozzle acceleration profile 1756, in some embodiments. Using the relative nozzle acceleration profile, pump/brake controller 1752 is able to adjust velocity component 1750 to account for the delay between the motor command and the change in flow in the material.

Thus, pump/brake controller 1752 produces a velocity component 1750 of the motor command that varies with changes in the relative velocity and relative acceleration of the nozzle. As described above, if the motor command only includes the velocity component 1750, the resulting bead width of the material may vary due to mechanical features of the pump/brake. To compensate for and reduce this variation in the bead width, a ripple compensator 1708 of processing program 144 generates time-varying component 1712 that can be added to or incorporated with velocity component 1750 to form pump command 1716. In particular, time-varying component 1602 has its amplitude, phase, frequencies and shape set so as to partially or fully cancel the variations in the flow that would otherwise result from the mechanical features of the pump or brake used to extrude the material.

Figure 18:
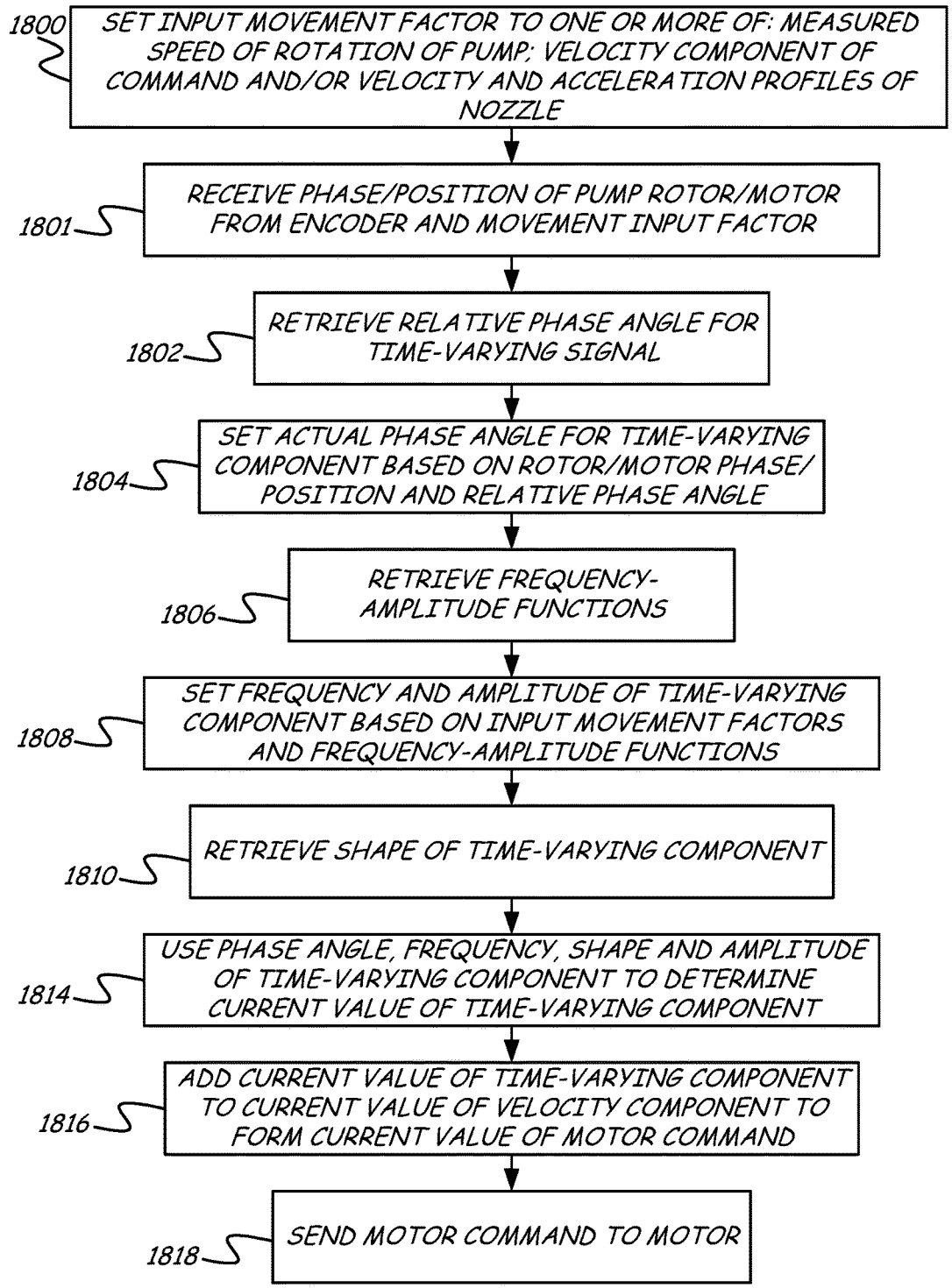
FIG. 18 is a flow diagram of a method of generating a time-varying signal to reduce ripples in a deposited molten material.

FIG. 18 provides a flow diagram of a method in accordance with one embodiment for generating and using time-varying component 1712 to reduce the ripple in the deposited material.

At step 1800 of FIG. 18, an input movement factor is set to one or more of a measured speed of rotation of the pump or brake, the velocity component 1750, and/or nozzle velocity and nozzle acceleration profiles 1754 and 1756. The speed of rotation of the pump or brake can be determined from a position encoder 1706 on the motor or pump. When the input movement factor is set to the measured speed of rotation of the pump or brake, the embodiment is considered to use feedback to set time-varying component 1712. When the input movement factor is set to velocity component 1750 or nozzle velocity and acceleration profiles 1754 and 1756, the embodiment is considered to use movement predictions or estimates to set time-varying component 1712. Using such predictions or estimates allows time-varying component 1712 to be created deterministically.

At step 1801 of FIG. 18, a position or phase 1700 and a rate of movement or speed of rotation 1702 of a pump/brake member or motor 84 are received. These values can be received from position encoder 1706 through an encoder interface 1704, which stores the values in storage media 138. Position or phase 1700 and rate of movement or speed of rotation 1702 represent the current state of the pump/brake member and motor 84. Position encoder 1706 can determine the phase/position and speed of rotation/movement of the pump member or motor 84 using physical or optical markings on the pump member or motor 84. The pump/brake member can be a gear such as drive gear 74 and idler gear 76, or some other type of pump/brake member such as a piston member, a roots member, or a screw member. In some embodiments position encoder 1706 is located on the motor opposite the connection to the pump while in other embodiments, the position encoder is located on the shaft connecting the motor to the pump. In embodiments in which the motor includes one or more gears and position encoder 1706 is not located on the shaft between the motor and the pump, position encoder 1706 and/or encoder interface 1704 scale the movement detected by position encoder 1706 to account for the gear ratio between the movement detected by position encoder 1706 and the movement of the shaft connected to pump 1702.

At step 1802, a ripple compensator 1708 in processing program 144 determines a relative phase angle for the time-varying component of the pump command from a compensation map 1710 stored on storage media 138 and/or based on the input movement factor. The relative phase angle describes the phase difference between a particular pump member/motor position 1700 (a state of the pump/brake member) and a particular phase of the time-varying component of the pump command that will be provided to motor 84 to reduce the ripple in the bead width. In some embodiments, the relative phase angle is stored in compensation map 1710 based on tests performed on gear assembly 52 to identify the best relative phase angle for gear assembly 52. Thus, different types of gear assemblies can have different relative phase angles stored in compensation map 1710. In other embodiments, the different relative phase angles are used for different speeds of the pump. In such embodiments, the input movement factor is used to determine a current or predicted speed of the pump and this speed is used to calculate the relative phase angle or is used to retrieve a corresponding relative phase angle from compensation map 1710.

At step 1804, the relative phase angle from compensation map 1710 is used by ripple compensator 1708 to set an actual phase angle for the time-varying component based on the position/phase of the pump member/motor 1700. In one particular embodiment, the actual phase angle is the sum of the relative phase angle from compensation map 1710 and the current phase of the pump member/motor 1700.

At step 1806, ripple compensator 1708 retrieves a frequency-amplitude function from compensation map 1710. The frequency-amplitude function describes the frequency and amplitude for the time-varying component of the pump command as a function of the predicted or actual frequency of rotation or speed of movement of the pump member/motor 1702 as provided by the input movement factor. At step 1808, ripple compensator 1708 uses the retrieved frequency-amplitude function and the input movement factor to set the frequency and amplitude for the time-varying component of the pump command. In general, the frequency and amplitude of the time-varying component increase as the frequency or rotation or speed of movement of the pump member/motor increases. Thus, in general, the frequency and amplitude both increase with increases in the input movement factor.

At step 1810, ripple compensator 1708 retrieves a shape for the time-varying component from compensation map 1710. Possible shapes for the time-varying component include sinusoidal, saw tooth and square, for example. In accordance with one embodiment, the shape of the time-varying is dependent on attributes of the gear assembly. In other embodiments, the shape for time-varying component 1712 is fixed in ripple compensator 1708 and does not have to be retrieved.

At step 1814, ripple compensator 1708 uses the phase angle, frequency, shape and amplitude of the time-varying component to determine a current value for the time-varying component, which is stored as time-varying component of pump command 1712.

At step 1816, an adder 1714 in processing program 144 adds or combines the time-varying component of the pump command 1712 with the velocity component of the pump command 1750 to incorporate the time-varying component into a pump command 1716 that is provided to a motor interface 1718. Motor interface 1718 converts the pump command 1716 into a motor driver signal that is provided to motor 84 at step 1818. The ripple-compensated command is then used by motor 84 to drive gear assembly 52 and deposit material with reduced ripples as shown in FIG. 15.

Thus, during steps 1800-1818, controller 38 uses the state of the pump member/rotor provided by the encoder signal of the position encoder to modify the time-varying component.

Steps 1800-1818 are repeated to provide a series of pump commands 1750 that together represent a pump command signal that has a time-varying signal incorporated therein to reduce ripple in the bead width of a deposited layer output by an extruder. Thus, through steps 1800-1818, controller 38 applies a time-varying signal to the extruder to compensate for time-varying changes in the flow of material that would otherwise occur due to the mechanical features of the extruder.

Although a molten material has been discussed in other parts of the specification, the steps of FIG. 18 and the apparatus of FIG. 17 may be used with other materials including materials that are viscous or paste-like at room temperature and standard pressures, for example.

Although the present disclosure has been described with reference to preferred embodiments, workers skilled in the art will recognize that changes may be made in form and detail without departing from the spirit and scope of the disclosure.

The invention claimed is:

1. An assembly for use in an additive manufacturing system to print a three-dimensional part, the assembly comprising:
an extruder comprising:
a casing assembly having an interior cavity between an inlet and an outlet, wherein the interior cavity is configured to accept a polymeric based material in a molten state;
a gear retained within the casing, wherein the gear is positioned within the interior cavity and wherein the gear is configured to engage and move the molten polymeric based material towards the outlet; and
a drive that turns the gear, wherein rotation of the gear regulates a flow of material out of the extruder; and
a controller, providing a control signal to the motor to control the rate at which the motor turns the gear, the controller incorporating a time-varying signal into the control signal to reduce ripples in the molten material output by the extruder.

2. The assembly of claim 1 wherein the controller generates the time-varying component based on an input movement factor comprising at least one of: a measured speed of rotation of the gear, a velocity-based signal that controls the rate at which the material is output by the extruder, and a predicted relative velocity between the extruder and an area that receives the material.

3. The assembly of claim 2 wherein the controller generates the time-varying component based on the input movement factor such that a frequency of the time-varying component increases with increases in the input movement factor.

4. The assembly of claim 3 wherein the controller generates the time-varying component based on the input movement factor such that an amplitude of the time-varying component increases with increases in the input movement factor.

5. The assembly of claim 1 wherein the controller generates the time-varying component by setting a phase angle for the time-varying component.

6. The assembly of claim 5 wherein the controller sets the phase angle for the time varying-component based on an input movement factor comprising at least one of: a measured speed of rotation of the gear, a velocity-based signal that controls the rate at which the material is output by the extruder, and a predicted relative velocity between the extruder and an area that receives the material.

7. The assembly of claim 1 wherein the controller incorporates the time-varying signal into the control signal by combining the time-varying signal with a velocity-based signal that controls the rate at which the material is output by the extruder based on a relative velocity between the extruder and an area that receives the material.

8. An additive manufacturing system for printing three-dimensional parts, the additive manufacturing system comprising:
 an extruder comprising a gear assembly the gear assembly comprising:
  a casing assembly having an interior cavity between an inlet and an outlet, wherein the interior cavity is configured to accept a polymeric based material in a molten state;
  a pump within the interior cavity of the casing assembly, the pump comprising;
   a first gear; and
   a second gear intermeshed with the first gear, the first and second gear counter-rotate and wherein the first and second gears are configured to engage and move the molten polymeric based material towards the outlet; and
  a drive configured to drive the first gear; and
 a controller assembly operably connected to the drive to provide command signals to the drive, the command signals controlling the rate at which the drive moves the first gear which causes counter-rotation of the second gear, the command signals comprising a time-varying component that reduces variations in a volume of material extruded through the outlet.

9. The additive manufacturing system of claim 8, wherein the command signal further comprises a velocity component that is based on a relative velocity between components that deposit the material extruded through the outlet of the opening and areas that receive the deposited material.

10. The additive manufacturing system of claim 9, wherein the controller assembly sets a frequency for the time-varying component based on a speed at which the motor rotates the pump member.

11. The additive manufacturing system of claim 10 further comprising a position encoder that measures a speed of rotation and that conveys the measured speed of rotation to the controller assembly.

12. The additive manufacturing system of claim 10, wherein the controller assembly sets a phase for the time-varying component based on a position of the pump member.

13. The additive manufacturing system of claim 8 wherein the controller assembly further comprises storage hardware that stores a previously determined value for at least one of an amplitude for the time-varying signal, a phase angle for the time-varying signal, and a frequency for the time-varying signal.

14. The additive manufacturing system of claim 13 wherein the storage hardware further stores a previously determined shape for the time-varying signal.

15. A method for printing a three-dimensional part with an additive manufacturing system, the method comprising controlling an extruder comprising counter-rotating first and second gear that moves molten polymeric based material toward an outlet so that the extruder extrudes material onto a surface as part of printing the three-dimensional part, wherein controlling the pump comprises applying a time-varying signal to the extruder to compensate for time-varying changes in the flow of material that would otherwise occur due to mechanical features of the counter-rotating first and second gears.

16. The method of claim 15 wherein applying the time-varying signal to the extruder reduces ripples in the deposited material that would otherwise occur due to the mechanical features of the counter-rotating first and second gears.

17. The method of claim 15 wherein applying the time-varying signal comprises setting a phase-angle of the time-varying signal based on a movement factor.

18. The method of claim 15 wherein applying the time-varying signal comprises determining a rate of rotation of the first and second counter-rotating gears in the extruder and setting a frequency of the time-varying signal based on the rate of rotation of the first and second counter-rotating gears.

19. The method of claim 15 wherein controlling the extruder further comprises varying a speed of a pump in the extruder to increase the flow of material as a relative speed between a nozzle that deposits the material and an area that receives the deposited material increases.

20. The method of claim 15 wherein applying the time-varying signal comprises setting an amplitude for the time-varying signal based on a movement factor.

\* \* \* \* \*